(12) United States Patent
Mukherjee et al.

(10) Patent No.: US 12,490,939 B2
(45) Date of Patent: Dec. 9, 2025

(54) OPTICAL SENSOR IN A BUTTON OF AN ELECTRONIC DEVICE

(71) Applicant: Google LLC, Mountain View, CA (US)

(72) Inventors: Debanjan Mukherjee, Palo Alto, CA (US); Yanting Zhang, San Diego, CA (US); Kevin Howard Drake, Campbell, CA (US); Seobin Jung, Redwood City, CA (US); Xiaoyu Guo, Santa Clara, CA (US); Wen Shian Lin, New Taipei (TW); Chijer Wang, Taipei (TW); Yi-Nan Chu, Taoyuan (TW)

(73) Assignee: GOOGLE LLC, Mountain View, CA (US)

( * ) Notice: Subject to any disclaimer, the term of this patent is extended or adjusted under 35 U.S.C. 154(b) by 456 days.

(21) Appl. No.: 18/186,591

(22) Filed: Mar. 20, 2023

(65) Prior Publication Data

US 2023/0293110 A1    Sep. 21, 2023

Related U.S. Application Data

(60) Provisional application No. 63/324,902, filed on Mar. 29, 2022, provisional application No. 63/321,513, filed on Mar. 18, 2022.

(51) Int. Cl.
*A61B 5/1455*    (2006.01)
*A61B 5/00*      (2006.01)

(52) U.S. Cl.
CPC ........ *A61B 5/6897* (2013.01); *A61B 5/14552* (2013.01); *A61B 2562/0238* (2013.01); *A61B 2562/046* (2013.01); *A61B 2562/166* (2013.01); *A61B 2562/185* (2013.01)

(58) Field of Classification Search
CPC . A61B 5/1455; A61B 5/14552; A61B 5/6897; A61B 5/0238; A61B 2562/046; A61B 2562/166; A61B 2562/185
See application file for complete search history.

(56) References Cited

U.S. PATENT DOCUMENTS

| | | | | |
|---|---|---|---|---|
| 5,990,866 | A * | 11/1999 | Yollin | G06F 3/03545 345/157 |
| 7,407,484 | B2 * | 8/2008 | Korman | A61B 5/6887 600/323 |
| 8,948,832 | B2 | 2/2015 | Hong et al. | |
| 10,099,554 | B2 * | 10/2018 | Steeg | A61B 5/1455 |
| 10,149,623 | B2 * | 12/2018 | Shimuta | A61B 5/6898 |
| 10,620,828 | B2 * | 4/2020 | Kim | G06F 3/0488 |
| 10,866,619 | B1 * | 12/2020 | Bushnell | G06F 3/044 |

* cited by examiner

*Primary Examiner* — Eric F Winakur
(74) *Attorney, Agent, or Firm* — DORITY & MANNING P.A.

(57) ABSTRACT

A computing device includes a housing defining an aperture extending therethrough. The computing device further includes a button that includes a switch and a body. The body is at least partially disposed within the aperture and movable relative to the housing between a first position and a second position to selectively actuate the switch to cause the computing device to perform a function. The button includes a printed circuit electrically coupled to one or more processors of the computing device. The button includes an optical sensor disposed within the interior of the body and configured to obtain biometric data for determining one or more biometrics of a user.

20 Claims, 12 Drawing Sheets

OPTICAL SENSOR IN A BUTTON OF AN ELECTRONIC DEVICE

PRIORITY CLAIM

The present application claims priority to U.S. Patent Application No. 63/324,902, titled "Optical Sensor in a Button of an Electronic Device," having a filing date of Mar. 29, 2022, which is incorporated by reference herein. The present application also claims priority to U.S. Patent Application No. 63/321,513, titled "Optical Sensor in a Button of an Electronic Device," having a filing date of Mar. 18, 2022, which is incorporated by reference.

FIELD

The present disclosure relates generally to an optical sensor in an electronic device such as, for instance, a computing device. More particularly, the present disclosure relates to an optical sensor in a button of an electronic device such as, for instance, a computing device.

BACKGROUND

Currently, optical sensors are used in various electronic and/or computing devices (e.g., smart watches, fitness trackers, smart phones) to capture a user's physiological data. An example of such an optical sensor is a photoplethysmography (PPG) sensor, and examples of the physiological data that can be captured by different optical sensors include data indicative of the user's heart rate, heart rate variability, pulse rate, respiration rate, and/or blood oxygenation level. To capture the user's physiological data, some optical sensors are disposed in components of electronic and/or computing devices that contact the user. For example, some optical sensors are disposed in an area of a watch that contacts the user's wrist, some optical sensors are disposed in a band or a strap that contacts the user's chest, and some optical sensors are disposed in a finger clip apparatus that contacts the user's finger. Additionally, some optical sensors utilize a camera and camera flash technology (e.g., such as a camera system in a smart phone or a tablet) to illuminate an area on a user using the light output by the camera flash and capture the user's physiological data using the camera and/or an optical sensor coupled to the camera.

SUMMARY

Aspects and advantages of implementations of the present disclosure will be set forth in part in the following description, or can be learned from the description, the appended claims, and/or the accompanying drawings, or can be learned through practice of the implementations.

In one aspect, a computing device is provided. The computing device includes a housing defining an aperture extending therethrough. The computing device further includes a button. The button includes a switch and a body. The body is at least partially disposed within the aperture and is movable relative to the housing between a first position and a second position to selectively actuate the switch to cause the computing device to perform a function. The button includes a printed circuit electrically coupled to one or more processors of the computing device. The button includes an optical sensor disposed within an interior of the body. The optical sensor is configured to obtain biometric data for determining one or more biometrics of a user. The optical sensor includes a substrate coupled to the printed circuit. The substrate has a length dimension and a width dimension that is less than the length dimension. The optical sensor includes one or more emitters positioned closer to a first end of the substrate that is spaced apart from a second end of the substrate along the length dimension of the substrate. The optical sensor includes one or more detectors positioned closer to the second end of the substrate.

In some implementations, the optical sensor can include an optical baffle disposed on the substrate to divide the substrate into a first portion including the one or more emitters and a second portion including the one or more detectors.

In some implementations, the one or more emitters include a first light emitting diode (LED) configured to emit red light and a second LED configured to emit green light. Furthermore, in some implementations, the one or more emitters can include a third LED configured to emit infrared light.

In some implementations, the first LED and the second LED are both positioned closer to the first end of the substrate than the third LED.

In some implementations, the length dimension of the substrate can be in a range of 7 millimeters to 9 millimeters. Furthermore, in some implementations, the width dimension of the substrate can range from 1 millimeter to 3 millimeters.

In some implementations, the button can include a sealing member positioned within the aperture between an exterior surface of the body and an interior surface of the housing.

In some implementations, the function that the switch causes the computing device to perform can include powering on and powering off the computing device.

In some implementations, the printed circuit can include a flexible printed circuit configured to support the body.

In some implementations, the button can further include a stiffener partially positioned within a gap defined between a first portion of the flexible printed circuit and a second portion of the flexible printed circuit. Furthermore, in some implementations, the stiffener does not contact the switch when the body is in the first position and does contact the switch when the body is in the second position. Alternatively, or additionally, the stiffener can, in some implementations, be formed from a metal material.

In some implementations, the button can further include a lens coupled to the body such that light emitted from the one or more emitters of the optical sensor exit the interior of the body via the lens.

In some implementations, the one or more biometrics can include at least one of a heart rate of the user or a blood oxygen level of the user.

In some implementations, the optical sensor can further include an application specific integrated circuit embedded in the substrate. The application specific integrated circuit can be configured to control operation of at least one of the one or more emitters or the one or more detectors.

In some implementations, the switch can include a tactile switch.

In another aspect, a button for a computing device is provided. The button includes a switch and a body movable between a first position and a second position to selectively actuate the switch. The button includes a printed circuit electrically couplable to one or more processors of the computing device. The button includes an optical sensor disposed within the interior of the body. The optical sensor includes a substrate coupled to the printed circuit, the substrate having a length dimension and a width dimension that is less than the length dimension. The optical sensor includes one or more emitters disposed on the substrate. The one or more emitters positioned closer to a first end of the substrate than a second end of the substrate that is spaced apart from the first end along the length dimension. The optical sensor includes one or more detectors positioned closer to the second end than the first end.

These and other features, aspects, and advantages of various implementations of the present disclosure will become better understood with reference to the following description and appended claims. The accompanying drawings, which are incorporated in and constitute a part of this specification, illustrate example implementations of the present disclosure and, together with the description, serve to explain the related principles.

BRIEF DESCRIPTION OF THE DRAWINGS

Detailed discussion of implementations directed to one of ordinary skill in the art is set forth in the specification, which makes reference to the appended figures, in which.

DETAILED DESCRIPTION

Figure 1A:
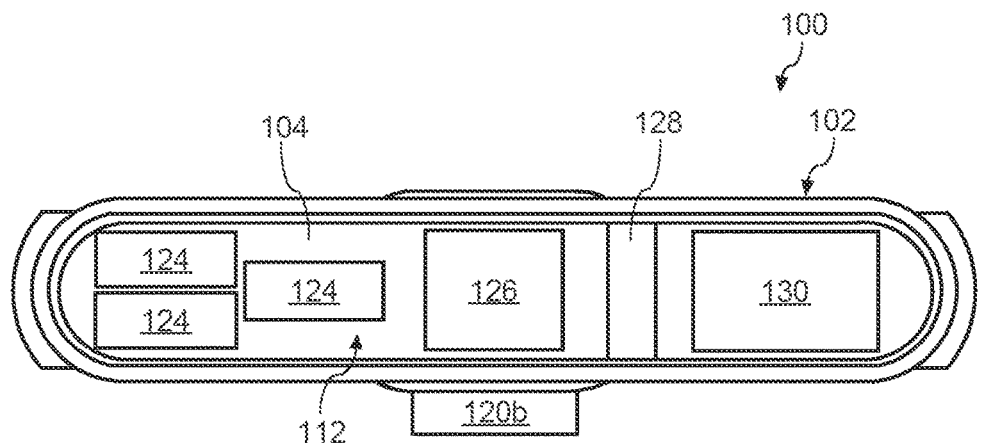
FIG. 1A illustrates a top view of an example, non-limiting optical sensor button having an optical sensor formed on a substrate according to one or more implementations of the present disclosure.

Reference now will be made in detail to implementations of the present disclosure, one or more examples of which are illustrated in the drawings. Each example is provided by way of explanation of the present disclosure, not limitation of the present disclosure. In fact, it will be apparent to those skilled in the art that various modifications and variations can be made in the present disclosure without departing from the scope or spirit of the disclosure. For instance, features illustrated or described as part of one implementation can be used with another implementation to yield a still further implementation. Thus, it is intended that the present invention covers such modifications and variations as come within the scope of the appended claims and their equivalents.

Repeat use of reference characters and/or numerals in the present specification and/or drawings is intended to represent the same or analogous features, elements, or operations of the present disclosure. Repeated description of reference characters and/or numerals that are repeated in the present specification is omitted for brevity.

As referenced herein, the term "entity" refers to a human, a user, an end-user, a consumer, a computing device and/or program (e.g., a processor, computing hardware and/or software, an application, etc.), an agent, a machine learning (ML) and/or artificial intelligence (AI) algorithm, model, system, and/or application, and/or another type of entity that can implement and/or facilitate implementation of one or more implementations of the present disclosure as described herein, illustrated in the accompanying drawings, and/or included in the appended claims. As referred to herein, the terms "includes" and "including" are intended to be inclusive in a manner similar to the term "comprising." As referenced herein, the terms "or" and "and/or" are generally intended to be inclusive, that is (i.e.), "A or B" or "A and/or B" are each intended to mean "A or B or both." As referred to herein, the terms "first," "second," "third," and so on, can be used interchangeably to distinguish one component or entity from another and are not intended to signify location, functionality, or importance of the individual components or entities. As referenced herein, the terms "couple," "couples," "coupled," and/or "coupling" refer to chemical coupling (e.g., chemical bonding), communicative coupling, electrical and/or electromagnetic coupling (e.g., capacitive coupling, inductive coupling, direct and/or connected coupling, etc.), mechanical coupling, operative coupling, optical coupling, and/or physical coupling.

Approximating language, as used herein throughout the specification, the appended claims, and/or the accompanying drawings is applied to modify any quantitative representation that could permissibly vary without resulting in a change in the basic function to which it is related. Accordingly, a value modified by a term or terms, such as "about," "approximately," and/or "substantially," are not to be limited to the precise value specified. In some implementations, the approximating language can correspond to the precision of an instrument for measuring the value. For example, the approximating language can refer to being within a 10 percent (%) margin. For instance, as used herein, the term or terms "about," "approximately," and/or "substantially" in conjunction with a numerical value can refer to within 10% of the indicated numerical value.

Overview

Example aspects of the present disclosure are directed to an optical sensor in a button of an electronic device such as, for instance, a computing device (e.g., a wearable computing device). Currently, optical sensors are used in various electronic and/or computing devices (e.g., smart watches, fitness trackers, smart phones) to capture a user's physiological data. An example of such an optical sensor is a photoplethysmography (PPG) sensor, and examples of the physiological data that can be captured by different optical sensors include data indicative of the user's heart rate (HR), pulse rate (PR), respiration rate, and/or blood oxygenation level (also referred to as "oxygen saturation" or "$SpO_2$").

To capture the user's physiological data, some optical sensors are disposed in components of electronic and/or computing devices that contact the user. For example, some optical sensors are disposed in an area of a watch that contacts the user's wrist, some optical sensors are disposed in area of a band or a strap that contacts the user's chest, and some optical sensors are disposed in a finger clip device that contacts the user's finger. Additionally, some optical sensors utilize a camera and camera flash technology (e.g., such as that of a camera system used in a smart phone or tablet) to illuminate an area on a user using the light output by the camera flash and capture the user's physiological data using the camera and/or an optical sensor coupled to the camera.

A problem with currently available fitness trackers worn on the user's wrist or chest is that they do not allow for the capture of physiological data from a finger and/or a fingertip of the user, where a relatively strong photoplethysmography (PPG) signal can be detected. Further, a problem with the above-described finger clip devices is that they are not incorporated in a portable, electronic and/or computing device for convenient and/or frequent access by the user. For instance, such finger clip devices and/or the optical sensors of such finger clip devices are not disposed in a button of a portable, electronic and/or computing device for convenient and/or frequent access by the user.

In addition, a problem with the optical sensors that are coupled to and/or integrated with a camera system (e.g., a camera system in a smart phone or a tablet) is that they involve the use of multiple cameras to capture different types of physiological data of a user. For example, such optical sensors that are coupled to and/or integrated with a camera system use a first camera (e.g., a front facing camera on a smart phone or a tablet) to capture certain type(s) of physiological data and a second camera (e.g., a rear facing camera on a smart phone or a tablet) to capture other type(s) of physiological data. That is, they do not use a single camera (e.g., either front facing or rear facing camera) to capture physiological data that is indicative of the user's heart rate, pulse rate, respiration rate, and blood oxygenation level. Another problem with some of such optical sensors that are coupled to and/or integrated with a camera system is that they do not utilize red and/or infrared wavelengths of light, and thus, they do not allow for the capture of physiological data that is indicative of a user's blood oxygenation level.

According to an example implementation of the present disclosure, a computing device such as, for example, a cellular phone, a smart phone, a tablet, a laptop, a computer, a wearable computing device (e.g., smart watch, smart glasses), and/or another type of computing device can include an external shell (e.g., a housing, an enclosure) having an aperture extending through the external shell. In this implementation, the computing device can further include a button positioned inside the aperture. In some implementations, the button can be a mechanical and/or physical button such as, for instance, a power button, a volume button, a home button, and/or another type of mechanical and/or physical button. In at least one implementation, the button can be operable to move inside the aperture and engage at least one internal component of the computing device. For instance, when engaged by an entity using the computing device, the button according to example implementations can move inside the aperture and contact, interface with, and/or couple to a switch (e.g., a tactile switch) and/or one or more springs of the computing device. In this example, the switch and/or spring(s) can be coupled to a circuit board of the computing device such that when the button is engaged by the entity (e.g., touched, pushed, toggled, and/or moved by the user), one or more operations can be performed by the computing device (e.g., power on or off, turn volume up or down, navigate to a home screen).

In at least one implementation described herein, the button can include a slotted section and a shaft coupled to the slotted section. In this or another implementation, the shaft can have a tunnel formed through the shaft such that the tunnel can extend from an end of the shaft to the slotted section. The button according to example implementations of the present disclosure can further include a circuit board that can have a first portion and a second portion. In multiple implementations, the first portion can be disposed in the slotted section and the second portion can extend through the tunnel from the first portion to an interior section of the computing device. For example, in these or other implementations, the second portion of the circuit board can extend through the tunnel from the first portion of the circuit board to one or more internal components of the computing device such as, for instance, a bus, a circuit board, a processor, and/or a memory (e.g., a non-transitory computer-readable storage medium) of the computing device. In at least one implementation, the second portion of the circuit board in the button can extend through the tunnel from the first portion of the circuit board to an interior section of the computing device and be coupled to a circuit board of the computing device (e.g., for power and/or communication operations) using, for instance, a low-profile connector (e.g., a zero-insertion force (ZIF) connector). The button according to example implementations of the present disclosure can further include an optical sensor disposed inside the slotted section, where the optical sensor can be coupled to the first portion of the circuit board in the slotted section of the button. In at least one implementation, the optical sensor can be a photoplethysmography sensor and/or a photoplethysmography sensor module.

In some implementations, the above-described circuit board that can be disposed in the button (e.g., in the slotted section and the tunnel) can be a flexible circuit board (e.g., a flexible printed circuit (PCB)). In some implementations, the above-described circuit board that can be disposed in the button (e.g., in the slotted section and the tunnel) can be a rigid circuit board (e.g., a rigid PCB).

In some implementations, the above-described circuit board that can be disposed in the computing device can be a flexible circuit board (e.g., a flexible PCB). In some implementations, the above-described circuit board that can be disposed in the computing device can be a rigid circuit board (e.g., a rigid PCB).

In multiple implementations, the optical sensor can be operable to capture physiological data of an entity (e.g., a human). For example, in some implementations, the optical sensor can be operable to capture physiological data that can include data indicative of a heart rate, a pulse rate, a respiration rate, a blood oxygenation level, and/or other physiological data of the entity. For instance, the button according to example implementations of the present disclosure can be configured to include the optical sensor in the slotted section of the button such that when the entity engages (e.g., touches, pushes, toggles, moves) the button using, for example, a finger and/or a fingertip of the entity, the optical sensor can capture the physiological data.

In at least one implementation, the computing device can include a display, one or more processors, and one or more non-transitory computer-readable storage media operable to store instructions that, when executed by the one or more processors, cause the computing device to perform one or more operations. In this or another implementation, the above-described second portion of the circuit board can be coupled to at least one of the one or more processors. In this or another implementation, the one or more operations that can be performed by the computing device can include rendering on the display a heart rate, a pulse rate, a respiration rate, and/or a blood oxygenation level of the entity based at least in part on the physiological data that can be captured by the optical sensor that can be disposed in a button of the computing device as described above.

According to one or more example implementations, the optical sensor can be formed on and therefore include a substrate. In these one or more example implementations, the substrate can be formed of one or more materials that can include, but are not limited to, silicon (Si), silicon dioxide ($SiO_2$), germanium (Ge), gallium arsenide (GaAs), aluminum oxide ($Al_2O_3$), sapphire, an alloy of silicon and germanium, indium phosphide (InP), diamond (C), and/or one or more other materials. In these one or more example implementations, the substrate of the optical sensor can have a first side coupled to the above-described first portion of the circuit board, thereby facilitating coupling of the optical sensor to the first portion of the circuit board. In these one or more example implementations, the optical sensor can include a plurality of emitters disposed on a second side of the substrate, where the second side of the substrate can be opposite the first side of the substrate. In these one or more example implementations, the optical sensor can further include a processor, an optical baffle, and/or a detector disposed on the second side of the substrate. In at least one implementation, the optical baffle can be positioned between the plurality of emitters and the detector on the second side of the substrate. In this or another implementation, the plurality of emitters can be disposed on a first end of the substrate and the detector can be disposed on a second end of the substrate, where the second end of the substrate can be opposite the first end of the substrate.

In multiple implementations, the optical baffle can be operable to limit crosstalk associated with the plurality of emitters and/or the detector (e.g., to limit crosstalk associated light signals emitted by at least one of the plurality of emitters). In some implementations, the plurality of emitters can include, for example, a green light-emitting diode operable to emit green light wavelengths (also referred to herein as a "green LED"), a red light-emitting diode operable to emit red light wavelengths (also referred to herein as a "red LED"), an infrared light-emitting diode operable to emit infrared light wavelengths (also referred to herein as a "infrared LED"), and/or another light-emitting diode. In these implementations, the red LED and/or the infrared LED can be used to support the detection and/or capture of data indicative of an entity's blood oxygenation level. In these implementations, the green LED can be used to support the detection and/or capture of data indicative of an entity's heart rate and/or pulse rate. In some implementations, one or more of the plurality of light-emitting diodes can be a single-channel light-emitting diode. In one or more implementations, the processor described above that can be included in the optical sensor can be, for example, an application specific integrated circuit (ASIC).

In an additional or alternative implementation, the optical sensor can be formed on and therefore include the substrate described above that can have a first side coupled to the first portion of the circuit board described above. In this or another implementation, the optical sensor can include the above-described plurality of emitters disposed on a second side of the substrate, where the second side of the substrate can be opposite the first side of the substrate. In this or another implementation, the optical sensor can further include a processor such as, for example, an ASIC embedded in the substrate. In this or another implementation, the optical sensor can also include the above-described detector disposed on the second side of the substrate and the above-described optical baffle disposed on the second side of the substrate, where the optical baffle can be positioned between the plurality of emitters and the detector.

In another additional or alternative implementation, the optical sensor can be formed on the above-described circuit board (e.g., a flexible PCB, a rigid PCB) that can be disposed in the button (e.g., in the slotted section and the tunnel). For example, in this additional or alternative implementation, the optical sensor can be formed directly on one or more surfaces of one or more portions of the circuit board (e.g., as opposed to implementations having the optical sensor formed on a substrate that is coupled to the first portion of the circuit board as described above). In this additional or alternative implementation, the optical sensor can include the above-described plurality of emitters, optical baffle, and detector all disposed on the first portion of the circuit board, where the optical baffle can be positioned between the plurality of emitters and the detector. In this additional or alternative implementation, the plurality of emitters can be disposed on a first end of the first portion of the circuit board and the detector can be disposed on a second end of the first portion of the circuit board, where the second end of the first portion of the circuit board can be opposite the first end of the first portion of the circuit board. In this additional or alternative implementation, the optical sensor can further include a processor such as, for example, an ASIC disposed on the second portion of the circuit board, where the processor can be disposed on a section of the second portion of the circuit board that is positioned inside the tunnel of the shaft of the button.

In some implementations, the button described herein can include a channel (e.g., a groove) that can be formed in an external surface of the shaft of the button, where the channel can be formed around the shaft of the button. In these or other implementations, a sealing member such as, for instance, an O-ring can be disposed inside the channel such that the sealing member interfaces with at least one surface of the channel and at least one surface of the aperture of the computing device. In these or other implementations, such a sealing member (e.g., an O-ring) can be operable to prevent debris, liquid, and/or gas from entering the interior of the computing device by way of the aperture.

In multiple implementations, the above-described channel and/or sealing member can be configured and/or operable such that when the button is implemented in the computing device, the button and the computing device together satisfy one or more criteria of one or more debris and/or liquid proof and/or resistant standards. For example, in one or more implementations, the channel and/or sealing member can be configured and/or operable such that when the button is implemented in the computing device, the button and the computing device together satisfy the criteria of the IP68 international waterproof and/or water-resistant standard.

In at least one implementation, the button described herein can include a lens extending across and coupled to the slotted section of the button. For example, in this or another implementation, the lens can extend across the slotted section where the optical sensor can be disposed such that the lens can cover and/or protect the optical sensor. In this or another implementation, the lens can be transparent to one or more different wavelengths of light such as, for instance, green light wavelengths, red light wavelengths, infrared light wavelengths, and/or another wavelength of light. In this or another implementation, the lens can be coupled to the slotted section of the button using, for instance, a sealant, an epoxy, a glue, and/or another material that can be used to couple the lens to the slotted section of the button to prevent debris, liquid, and/or gas from entering the interior of the slotted section of the button. In one or more implementations, the lens can be formed using a material such as, for example, glass, sapphire, plastic, and/or another material that can protect the optical sensor and be transparent to one or more different wavelengths of light such as, for instance, green light wavelengths, red light wavelengths, infrared light wavelengths, and/or another wavelength of light.

In some implementations, one or more seams and/or joints of the button can be sealed to prevent debris, liquid, and/or gas from entering the interior of the button and/or the computing device by way of such seam(s) and/or joint(s). For example, in these or other implementations, such seam(s) and/or joint(s) of the button can be sealed using, for instance, a sealant, an epoxy, a glue, and/or another material that can be used to seal such seam(s) and/or joint(s) of the button to prevent debris, liquid, and/or gas from entering the interior of the button and/or the computing device by way of such seam(s) and/or joint(s).

In multiple implementations, the above-described seam(s) and/or joint(s) of the button, including those associated with implementations having the lens coupled to the slotted section as described above, can be sealed such that when the button is implemented in the computing device, the button and the computing device together satisfy one or more criteria of one or more debris and/or liquid proof and/or resistant standards. For example, in one or more implementations, all areas that can allow for ingress to the interior of the button and/or the computing device (e.g., all seams, joints, and/or crevasses of the button) can be sealed such that when the button is implemented in the computing device, the button and the computing device together satisfy the criteria of the IP68 international waterproof and/or water-resistant standard.

According to one or more example implementations, the above-described button having an optical sensor disposed therein can be a standalone device that is separate from and/or not implemented in the computing device as described above. For example, in some implementations, the button described above can be an optical sensor button that can be used (e.g., implemented, installed) in a computing device such as, for instance, the above-described computing device. In these or other implementations, such a standalone, optical sensor button can include the same structure, components, and/or functionality as that of the button described above that can have an optical sensor disposed therein (e.g., a PPG sensor). For example, in multiple implementations, such a standalone, optical sensor button can include the same structure, components, and/or functionality as that of any of the example implementations of the button described above that can have an optical sensor disposed therein (e.g., a PPG sensor).

However, in such implementations where the above-described button constitutes a standalone, optical sensor button, the second portion of the above-described circuit board is not coupled to one or more internal components of a computing device as described above since such a standalone, optical sensor button is not coupled to a computing device in these implementations. Instead, in these implementations, the second portion of the circuit board disposed in the optical sensor button extends through the tunnel from the first portion of the circuit board to a location that is external to the optical sensor button (e.g., as opposed to being coupled to one or more internal components of a computing device as described above).

According to one or more example implementations described herein, a method is provided to fabricate the above-described optical sensor in a button structure to produce the optical sensor button described above that can be used in a computing device (e.g., cellular phone, smart phone, tablet, laptop, computer, wearable computing device). For instance, in at least one implementation, a method to fabricate an optical sensor in a button structure (e.g., a physical or mechanical button that can be used in a computing device) to produce an optical sensor button for use in a computing device can include removing a first quantity of material from a first section of the button structure to form a slotted section. For example, in this or another implementation, the method can include removing the first quantity of material from a main body of a button structure (e.g., a physical or mechanical button that can be used in a computing device) to form a slotted section in the button structure.

In at least one implementation, the method described above can further include removing a second quantity of material from a second section of the button structure to form a tunnel extending from the slotted section to an end of the second section. For instance, in this or another implementation, the method can include removing the second quantity of material from a shaft of the button structure, where the shaft is adjacent to and/or perpendicular to the main body of the button structure. In one implementation, the method can include removing the second quantity of material from the shaft to form the tunnel in a concentric configuration with respect to the shaft (e.g., where the shaft and the tunnel share the same rotational axis). In another implementation, the method can include removing the second quantity of material from the shaft to form the tunnel in an eccentric configuration with respect to the shaft (e.g., where the shaft and the tunnel do not share the same rotational axis). In multiple implementations, the method can include removing the second quantity of material from the shaft of the button structure such that the tunnel creates a passageway between the slotted section and the end of the shaft that is opposite the slotted section.

In at least one implementation, the above-described method can further include coupling the optical sensor to a first portion of a circuit board (e.g., to the first portion of the above-described circuit board (e.g., a flexible PCB, rigid PCB)). In this or another implementation, the method can further include disposing the first portion of the circuit board and the optical sensor inside the slotted section. In this or another implementation, the method can further include routing a second portion of the circuit board (e.g., the second portion of the above-described circuit board (e.g., a flexible PCB, rigid PCB)) through the tunnel and out the end of the second section of the button structure such that the second portion of the circuit board extends through the tunnel from the first portion of the circuit board to a location external to the button structure.

In some implementations, the above-described operation of coupling the optical sensor to the first portion of the circuit board in the method described above can include coupling a photoplethysmography (PPG) sensor and/or a photoplethysmography (PPG) sensor module to the first portion of the circuit board. In these or other implementations, the photoplethysmography (PPG) sensor and/or the a photoplethysmography (PPG) sensor module can be operable to capture physiological data of an entity (e.g., a human), where the physiological data can include and/or constitute data that can be indicative of a heart rate, a pulse rate, a respiration rate, and/or a blood oxygenation level of the entity.

In one or more implementations, the method described above can further include forming the optical sensor on a first side (e.g., a top side) of a substrate. In these one or more implementations, the above-described operation of coupling the optical sensor to the first portion of the circuit board in the method described above can include coupling a second side (e.g., a bottom side) of the substrate to the first portion of the circuit board, where the second side (e.g., a bottom side) of the substrate can be opposite the first side (e.g., a top side) of the substrate. In these one or more implementations, the above-described operation of forming the optical sensor on the first side of the substrate in the method described above can include: forming a plurality of emitters (e.g., one or more green LED, red LED, infrared LED) on a first end of the first side of the substrate; forming a processor (e.g., an ASIC) on the first side of the substrate; forming a detector (e.g., the detector described above) on a second end of the first side of the substrate, where the second end of the first side of the substrate can be opposite the first end of the first side of the substrate; and/or forming an optical baffle (e.g., the optical baffle described above) between the plurality of emitters and the detector on the first side of the substrate.

In an additional or alternative implementation, the above-described operation of forming the optical sensor on the first side of the substrate in the method described above can include: forming a plurality of emitters (e.g., one or more green LED, red LED, infrared LED) on a first end of the first side of the substrate; forming a processor (e.g., an ASIC) inside the substrate such that the processor is embedded in the substrate; forming a detector (e.g., the detector described above) on a second end of the first side of the substrate, where the second end of the first side of the substrate can be opposite the first end of the first side of the substrate; and/or forming an optical baffle (e.g., the optical baffle described above) between the plurality of emitters and the detector on the first side of the substrate.

In another additional or alternative implementation, the method described above can include forming a processor (e.g., an ASIC) of the optical sensor on a section of the second portion of the circuit board that is to be positioned inside the tunnel of the second section (e.g., the shaft) of the button structure. For example, in this additional or alternative implementation, the method can include forming the processor of the optical sensor on a section of the second portion of the circuit board that will be positioned inside the tunnel of the second section (e.g., the shaft) of the button structure after routing the second portion of the circuit board through the tunnel and out the end of the second section of the button structure.

In at least one implementation, the method described above can further include removing a third quantity of material from the second section (e.g., the shaft) of the button structure to form a channel (e.g., a groove) in an external surface of the second section of the button structure such that the channel wraps around, surrounds, and/or encircles the second section of the button structure. In this or another implementation, the method can further include disposing (e.g., inserting, placing) a sealing member (e.g., an O-ring) inside the channel such that the sealing member interfaces with at least one surface of the channel. In this or another implementation, the method can further include disposing a lens across the slotted section and/or coupling the lens to the slotted section (e.g., using a sealant, an epoxy, a glue).

In some implementations, the optical sensor button described above can be a virtual button that can be implemented in a computing device such as, for example, a cellular phone, a smart phone, a tablet, a laptop, a computer, a wearable computing device (e.g., smart watch, smart glasses), and/or another type of computing device that can have an external shell (e.g., a housing, an enclosure). In these implementations, such a virtual optical sensor button can include the same or similar structure, components, and/or functionality as that of the optical sensor button described above, which can be a mechanical or physical optical sensor button according to one or more example implementations.

However, in implementations where the optical sensor button described above can be a virtual button, such a virtual optical sensor button can be disposed (e.g., embedded) in the external shell of the computing device rather than positioned in an aperture formed in the external shell of the computing device and extending through the external shell as described above in example implementations of the optical sensor button. In some implementations, such a virtual optical sensor button does not include the above-described channel that can be formed around the shaft of the optical sensor button according to one or more example implementations. In these implementations, such a virtual optical sensor button also does not include the sealing member (e.g., O-ring) that can be disposed in the channel of the optical sensor button according to example implementations to prevent debris and/or liquid from entering the interior of the computing device by way of the aperture.

Instead, in implementations where the optical sensor button described above can be a virtual button, such a virtual optical sensor button can be disposed (e.g., embedded) in, for instance, a slotted section of the external shell of the computing device (e.g., at an edge, corner, or bezel portion of the external shell). In these implementations, the optical sensor described above, including the above-described plurality of emitters, processor, optical baffle, and detector, can be disposed inside the slotted section of the external shell of the computing device. In these implementations, the lens described above can extend across and be coupled to the slotted section of the external shell of the computing device. In these implementations, the optical sensor described above can further include the above-described circuit board having a first portion and a second portion. In these implementations, the first portion of the circuit board can be disposed in the slotted section of the external shell of the computing device and the second portion of the circuit board can extend through an opening in the external shell to an interior section of the computing device. In these implementations, an end of the second portion of the circuit board can be coupled to, for instance, a bus, a circuit board, a processor, and/or a memory of the computing device.

Example aspects of the present disclosure provide several technical effects, benefits, and/or improvements in optical sensor and/or computing device technology. For instance, example implementations described herein allow for the capture of an entity's physiological data from a finger and/or a fingertip of the entity, where a relatively strong photoplethysmography (PPG) signal can be detected. In these example implementations, by providing for such capture of an entity's physiological data at a location where a relatively strong PPG signal can be detected such as at a finger and/or fingertip of the entity, the optical sensor button of the present disclosure can thereby capture PPG measurements that are relatively more accurate than those captured at another location such as at a wrist or the chest of the entity. In these example implementations, by providing for the capture of relatively more accurate PPG measurements, the optical sensor button of the present disclosure can thereby improve the performance and/or efficiency of a processor (e.g., the ASIC described above) tasked with performing one or more operations to facilitate capturing such PPG measurements (e.g., by reducing the number of processing cycles that such a processor would otherwise complete before accurate PPG measurements are captured). In these example implementations, by reducing the performance and/or efficiency of such a processor, the optical sensor button of the present disclosure can also reduce computational costs of such a processor.

Further, the optical sensor button according to example implementations of the present disclosure can be implemented in, for example, a portable electronic device and/or a portable computing device for convenient and/or frequent access by an entity associated with such a device (e.g., a human using the device). For instance, the optical sensor button described in multiple implementations herein can be implemented as a button (e.g., a mechanical button, physical button, virtual button, an operation button, a function button, a settings button, power button, volume button, home button) of a portable electronic device and/or a portable computing device (e.g., a smart phone, tablet) for convenient and/or frequent access by the entity. In these implementations, the optical sensor button can provide for capturing physiological data indicative of an entity's heart rate, pulse rate, respiration rate, and/or blood oxygenation level. In these implementations, the optical sensor button can thereby allow for consolidation and/or elimination of one or more other devices (e.g., fitness tracker) and/or components that would otherwise be involved with or used to capture such physiological data of an entity (e.g., a human).

With reference now to the Figures, example implementations of the present disclosure will be discussed in further detail.

Example Devices, Systems, and Methods

Figure 1B:
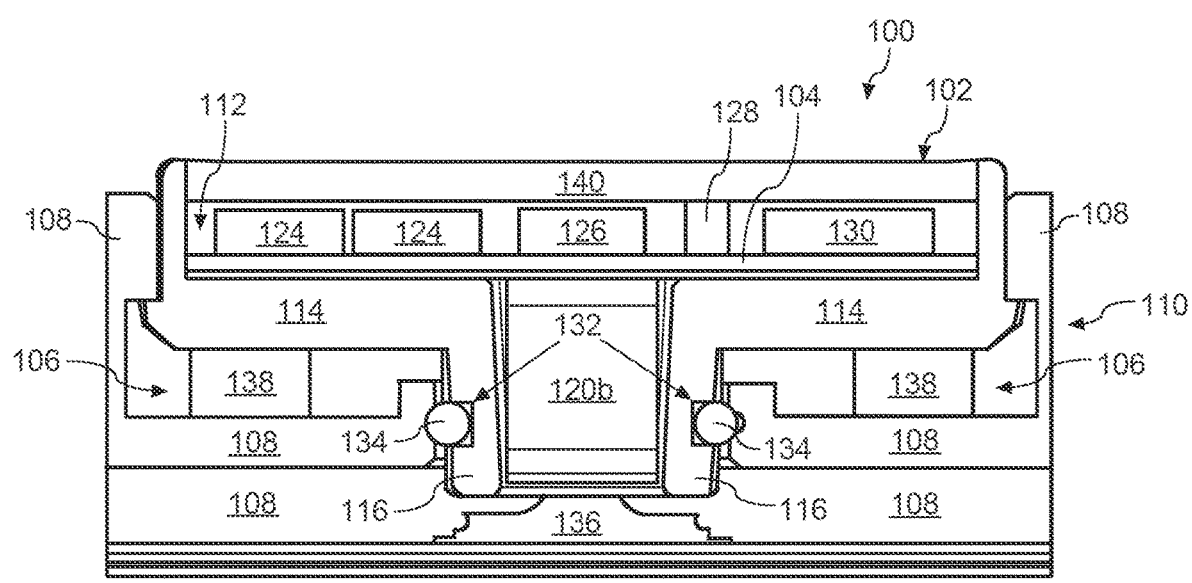
FIG. 1B illustrates a cross-sectional, side view of the optical sensor button of FIG. 1A implemented in a computing device according to one or more implementations of the present disclosure.
Figure 1C:
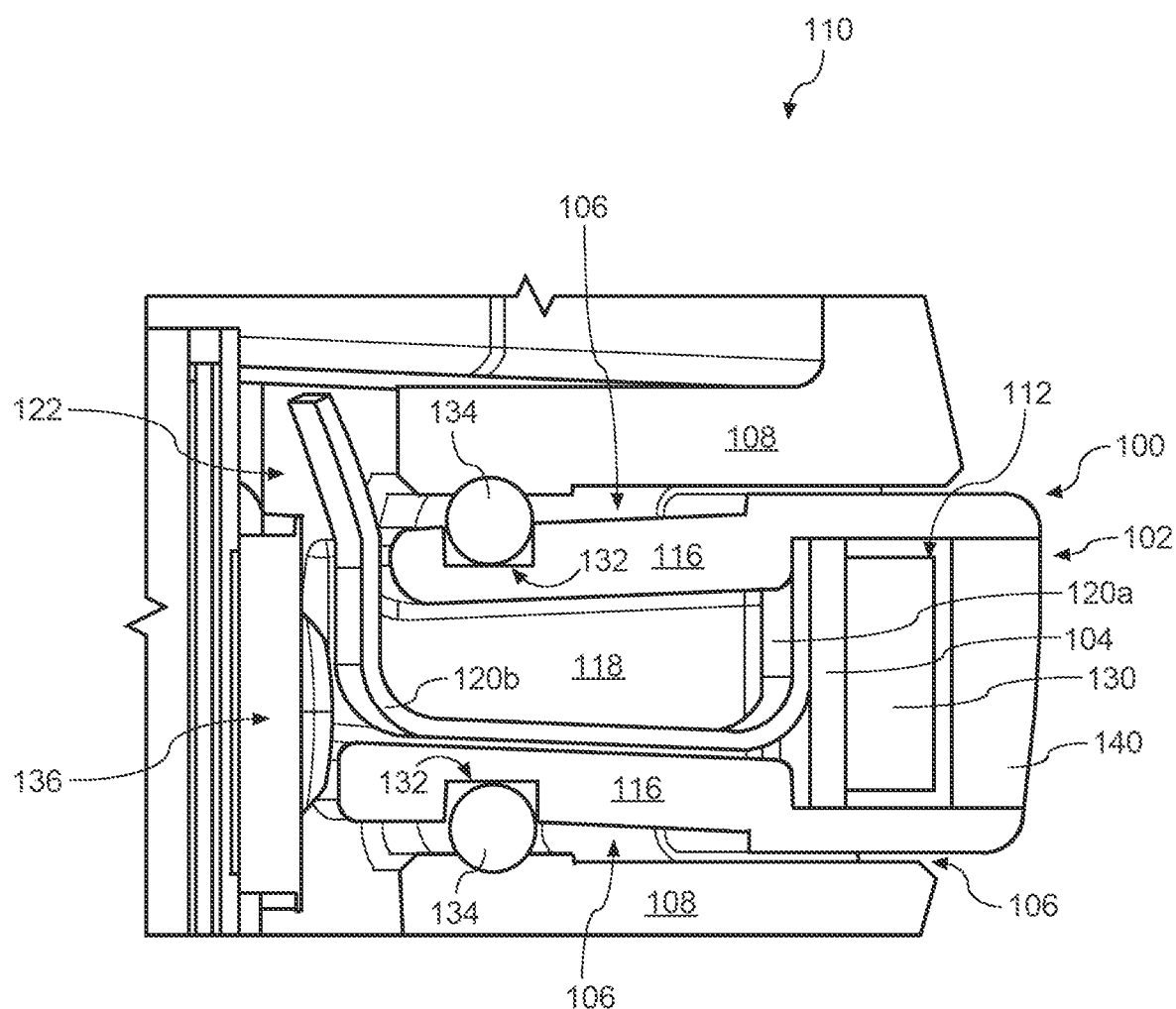
FIG. 1C illustrates a cross-sectional, perspective view of the optical sensor button of FIG. 1A implemented in a computing device according to one or more implementations of the present disclosure.

FIG. 1A illustrates a top view of an example, non-limiting optical sensor button 100 having an optical sensor 102 formed on a substrate 104 according to one or more implementations of the present disclosure. FIGS. 1B and 1C respectively illustrate a cross-sectional, side view and a cross-sectional, perspective view of optical sensor button 100 disposed in an aperture 106 of an external shell 108 (e.g., a housing, an enclosure) of a computing device 110 according to one or more implementations of the present disclosure. In some implementations, optical sensor 102 can be a photoplethysmography (PPG) sensor, a photoplethysmography (PPG) sensor module, an electrodermal activity (EDA) sensor, and/or another optical sensor. In some implementations, computing device 110 can be a cellular phone, a smart phone, a tablet, a laptop, a computer, a wearable computing device (e.g., smart watch, smart glasses), and/or another type of computing device.

With reference to the example implementation depicted in FIGS. 1A, 1B, and 1C, optical sensor button 100 can include optical sensor 102 disposed inside of a slotted section 112 formed in a main body 114 of optical sensor button 100. In this or another implementation, main body 114 of optical sensor button 100 can further include a shaft 116 having a tunnel 118 formed through shaft 116 such that tunnel 118 extends from an end of shaft 116 to slotted section 112.

In the implementation depicted in FIGS. 1A, 1B, and 1C, optical sensor 102 can be formed on a first side (e.g., top side) of substrate 104 and a second side (e.g., bottom side) of substrate 104 can be coupled (e.g., electrically, communicatively, operatively) to a portion of a circuit board 120. For example, as illustrated in FIGS. 1B and 1C, the second side (e.g., a bottom side) of substrate 104 can be coupled to a first portion 120a of circuit board 120 that can be disposed in slotted section 112 (e.g., on a bottom surface of slotted section 112). In this implementation, circuit board 120 can further include a second portion 120b that can extend through tunnel 118 of shaft 116 and into an interior section 122 of computing device 110. In some implementations, circuit board 120 including first portion 120a and second portion 120b can be a flexible circuit board (e.g., a flexible PCB). In some implementations, circuit board 120 including first portion 120a and second portion 120b can be a rigid circuit board (e.g., a rigid PCB).

Although not illustrated in the example implementation depicted in FIGS. 1A, 1B, and 1C, in some implementations, second portion 120b of circuit board 120 can be coupled (e.g., electronically, communicatively, operatively) to, for instance, a bus, a circuit board (e.g., a rigid circuit board, flexible circuit board), a processor (e.g., a central processing unit (CPU), microprocessor), and/or a memory (e.g., a non-transitory computer-readable storage medium) of computing device 110. In at least one implementation, second portion 120b of circuit board 120 in optical sensor button 100 can extend through tunnel 118 from first portion 120a of circuit board 120 to interior section 122 of computing device 110 and be coupled to a circuit board (not shown) of computing device 110 using, for instance, a low-profile connector (e.g., a zero-insertion force (ZIF) connector). In some implementations, second portion 120b of circuit board 120 can be coupled (e.g., electronically, communicatively, operatively) to, for instance, a bus, a circuit board (e.g., a rigid circuit board, flexible circuit board), a processor (e.g., a CPU, microprocessor), a memory (e.g., a non-transitory computer-readable storage medium), and/or one or more communication components (e.g., network communication components) of computing device 110 to, for instance, provide power to one or more components of optical sensor button 100 (e.g., optical sensor 102) and/or to facilitate communication between optical sensor button 100 and computing device 110.

In the example implementation depicted in FIGS. 1A, 1B, and 1C, optical sensor 102 can include a plurality of emitters 124, a processor 126, an optical baffle 128, and one or more detectors 130 (e.g., detectors) disposed on the first side (e.g., top side) of substrate 104. In some implementations, substrate 104 can be formed using one or more materials that can include, but are not limited to, silicon (Si), silicon dioxide ($SiO_2$), germanium (Ge), gallium arsenide (GaAs), aluminum oxide ($Al_2O_3$), sapphire, an alloy of silicon and germanium, indium phosphide (InP), diamond (C), and/or one or more other materials.

As illustrated in the example implementation depicted in FIGS. 1A, 1B, and 1C, emitters 124 can be disposed on one end of substrate 104 and detector(s) 130 can be disposed on another end (e.g., opposite end) of substrate 104, where optical baffle 128 can be positioned between emitters 124 and detector(s) 130. In multiple implementations, optical baffle 128 can be operable to limit crosstalk associated with emitters 124 and/or detector(s) 130 (e.g., to limit crosstalk associated light signals emitted by at least one of emitters 124).

In some implementations, emitters 124 can include, for example, a green light-emitting diode operable to emit green light wavelengths (also referred to herein as a "green LED"), a red light-emitting diode operable to emit red light wavelengths (also referred to herein as a "red LED"), an infrared light-emitting diode operable to emit infrared light wavelengths (also referred to herein as a "infrared LED"), and/or another light-emitting diode. In these implementations, the red LED and/or the infrared LED can be used to support the detection and/or capture of data indicative of an entity's blood oxygenation level. In these implementations, the green LED can be used to support the detection and/or capture of data indicative of an entity's heart rate and/or pulse rate. In some implementations, one or more of emitters 124 can be a single-channel light-emitting diode. In one or more implementations, processor 126 can be, for example, an application specific integrated circuit (ASIC).

As illustrated in the example implementation depicted in FIGS. 1A, 1B, and 1C, optical sensor button 100 can include a channel 132 (e.g., a groove) formed in an external surface of shaft 116 (e.g., formed in an external surface of and around shaft 116). In this or another implementation, a sealing member 134 such as, for instance, an O-ring can be disposed inside channel 132 such that sealing member 134 interfaces with at least one surface of channel 132 and at least one surface of aperture 106 of computing device 110 (e.g., an internal surface of external shell 108). In this or another implementation, sealing member 134 (e.g., an O-ring) can be operable to prevent debris, liquid, and/or gas from entering the interior of computing device 110 by way of aperture 106. In multiple implementations, channel 132 and/or sealing member 134 can be configured and/or operable such that optical sensor button 100 and computing device 110 together satisfy the criteria of the IP68 international waterproof and/or water-resistant standard.

In some implementations, optical sensor button 100 can be configured and/or operable as a mechanical and/or physical button such as, for instance, a power button, a volume button, a home button, and/or another type of mechanical and/or physical button. For example, in the example implementation depicted in FIGS. 1A, 1B, and 1C, optical sensor button 100, specifically the main body 114 thereof, can be operable to move inside aperture 106 between a first position and a second position to selectively engage, for instance, a tactile switch 136 and/or one or more springs 138 of computing device 110. For instance, when engaged by an entity using computing device 110, optical sensor button 100 according to example implementations can move inside aperture 106 and contact, interface with, and/or couple to tactile switch 136 and/or spring(s) 138 of computing device 110. In this example, tactile switch 136 and/or spring(s) 138 can be coupled to a circuit board of computing device 110 such that when optical sensor button 100 is engaged by the entity (e.g., touched, pushed, toggled, and/or moved by the user), one or more operations can be performed by computing device 110 (e.g., power on or off, turn volume up or down, navigate to a home screen).

As illustrated in the example implementation depicted in FIGS. 1A, 1B, and 1C, optical sensor button 100 can include a lens 140 extending across and coupled to slotted section 112 of optical sensor button 100. For example, in this or another implementation, lens 140 can extend across slotted section 112 where optical sensor 102 can be disposed such that lens 140 can cover and/or protect optical sensor 102. In this or another implementation, lens 140 can be transparent to one or more different wavelengths of light such as, for instance, green light wavelengths, red light wavelengths, infrared light wavelengths, and/or another wavelength of light. In this or another implementation, lens 140 can be coupled to slotted section 112 of optical sensor button 100 using, for instance, a sealant, an epoxy, a glue, and/or another material that can be used to couple lens 140 to slotted section 112 to prevent debris, liquid, and/or gas from entering the interior of the slotted section of the button. In one or more implementations, lens 140 can be formed using a material such as, for example, glass, sapphire, plastic, and/or another material that can protect optical sensor 102 and be transparent to one or more different wavelengths of light such as, for instance, green light wavelengths, red light wavelengths, infrared light wavelengths, and/or another wavelength of light.

In some implementations, one or more seams and/or joints of optical sensor button 100 can be sealed to prevent debris, liquid, and/or gas from entering the interior of optical sensor button 100 and/or computing device 110 by way of such seam(s) and/or joint(s). For example, in these or other implementations, such seam(s) and/or joint(s) of optical sensor button 100 can be sealed using, for instance, a sealant, an epoxy, a glue, and/or another material that can be used to seal such seam(s) and/or joint(s) to prevent debris, liquid, and/or gas from entering the interior of optical sensor button 100 and/or computing device 110 by way of such seam(s) and/or joint(s). In multiple implementations, the above-described seam(s) and/or joint(s) of optical sensor button 100, including those associated with lens 140 coupled to slotted section 112, can be sealed such that optical sensor button 100 and computing device 110 together satisfy the criteria of the IP68 international waterproof and/or water-resistant standard.

In multiple implementations, optical sensor button 100 and/or optical sensor 102 can be operable to capture physiological data of an entity (e.g., a human). For example, in some implementations, optical sensor button 100 and/or optical sensor 102 can be operable to capture physiological data that can include data indicative of a heart rate, a pulse rate, a respiration rate, a blood oxygenation level, and/or other physiological data of the entity. For instance, optical sensor button 100 according to example implementations of the present disclosure can be configured to include optical sensor 102 in slotted section 112 such that when the entity engages (e.g., touches, pushes, toggles, moves) optical sensor button 100 using, for example, a finger and/or a fingertip of the entity, optical sensor 102 can capture the physiological data.

Further, although not illustrated in the example implementation depicted in FIGS. 1A, 1B, and 1C, in some implementations, computing device 110 can include a display (e.g., a monitor, screen, touch screen, organic light-emitting diode (OLED), liquid crystal display (LCD)), one or more processors, and one or more non-transitory computer-readable storage media (e.g., random-access memory (RAM), read only memory (ROM), dynamic random-access memory (DRAM), flash memory) operable to store instructions that, when executed by the one or more processors, cause computing device 110 to perform one or more operations. In these or other implementations, second portion 120b of circuit board 120 can be coupled to at least one of the one or more processors. In these or other implementations, the one or more operations that can be performed by computing device 110 can include rendering on the display a heart rate, a pulse rate, a respiration rate, and/or a blood oxygenation level of the entity based at least in part on the physiological data that can be captured by optical sensor 102 that can be disposed in optical sensor button 100 implemented in computing device 110.

Figure 2A:
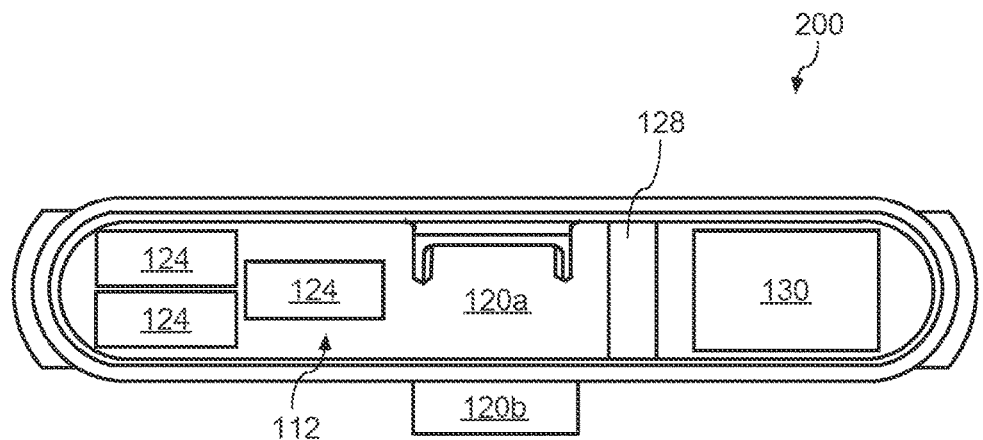
FIG. 2A illustrates a top view of an example, non-limiting optical sensor button having an optical sensor formed on a circuit board according to one or more implementations of the present disclosure.
Figure 2B:
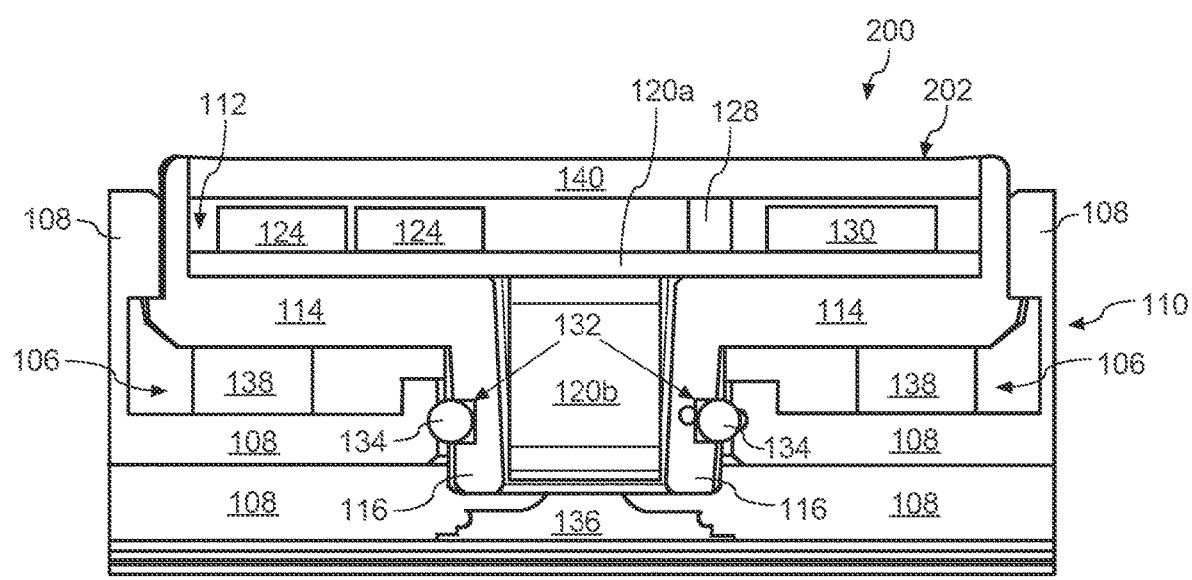
FIG. 2B illustrates a cross-sectional, side view of the optical sensor button of FIG. 2A implemented in a computing device according to one or more implementations of the present disclosure.
Figure 2C:
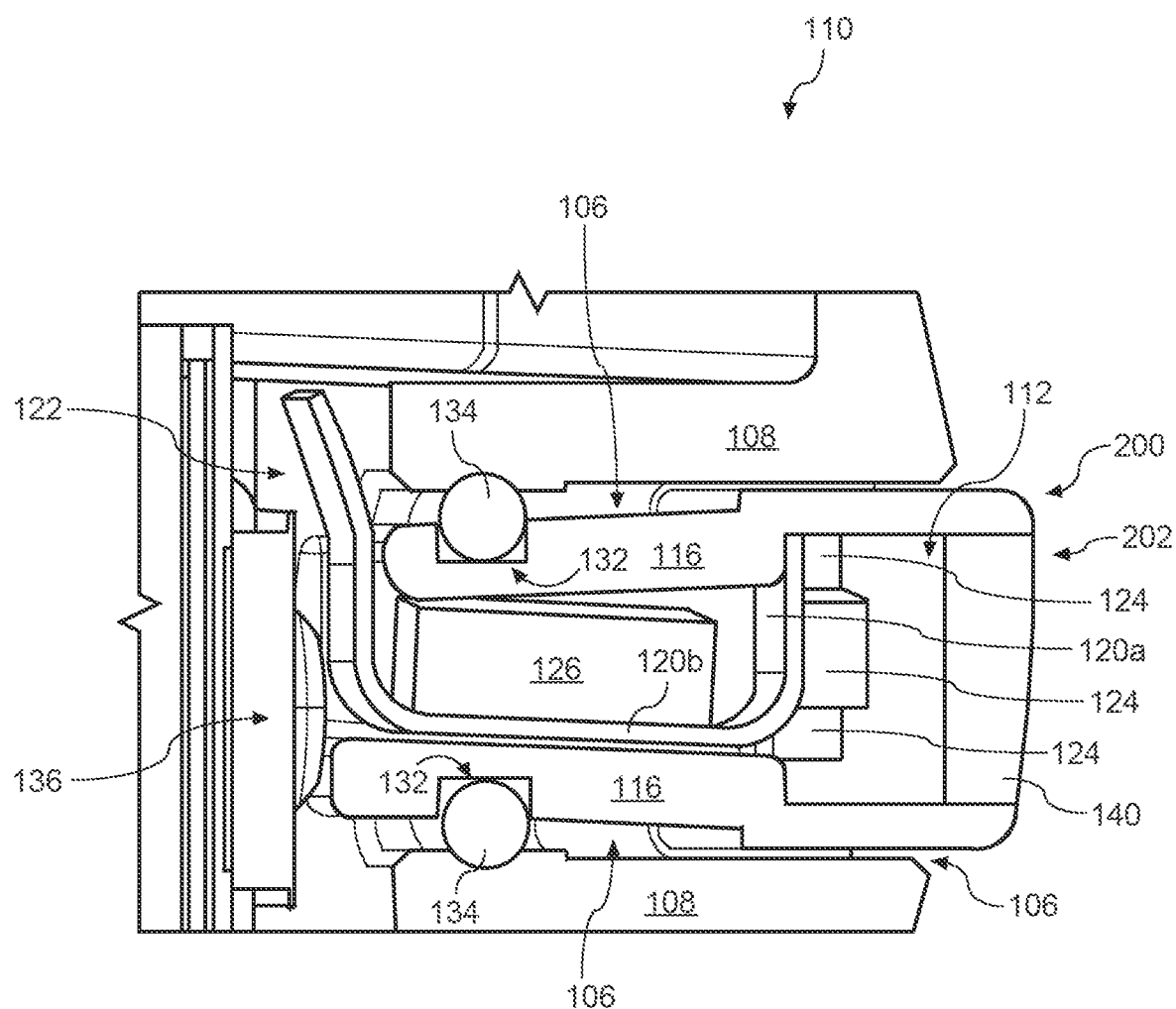
FIG. 2C illustrates a cross-sectional, perspective view of the optical sensor button of FIG. 2A implemented in a computing device according to one or more implementations of the present disclosure.

FIG. 2A illustrates a top view of an example, non-limiting optical sensor button 200 having an optical sensor 202 formed on circuit board 120 according to one or more implementations of the present disclosure. FIGS. 2B and 2C respectively illustrate a cross-sectional, side view and a cross-sectional, perspective view of optical sensor button 200 disposed in aperture 106 of external shell 108 of computing device 110 according to one or more implementations of the present disclosure.

Optical sensor button 200 and optical sensor 202 depicted in the example implementation depicted in FIGS. 2A, 2B, and 2C can constitute example, non-limiting alternative implementations of optical sensor button 100 and optical sensor 102, respectively. In the implementation depicted in FIGS. 2A, 2B, and 2C, optical sensor button 200 and optical sensor 202 can include the same attributes and/or functionality as that of optical sensor button 100 and optical sensor 102, respectively. However, in the example implementation depicted in FIGS. 2A, 2B, and 2C, optical sensor 202 of optical sensor button 200 can be formed directly on first portion 120a and second portion 120b of circuit board 120 (e.g., as opposed to optical sensor 102 formed on substrate 104 coupled to first portion 120a of circuit board 120 as described above and illustrated in the example implementation depicted in FIGS. 1A, 1B, and 1C).

As illustrated in the example implementation depicted in FIGS. 2A, 2B, and 2C, optical sensor 202 can include emitters 124, optical baffle 128, and detector(s) 130 (e.g., photodiodes) disposed on first portion 120a of circuit board 120, where optical baffle 128 can be positioned between emitters 124 and detector(s) 130. In this or another implementation, emitters 124 can be disposed on a first end of first portion 120a of circuit board 120 and detector(s) 130 can be disposed on a second end of first portion 120a of circuit board 120, where the second end of first portion 120a of circuit board 120 can be opposite the first end of first portion 120a of circuit board 120. In this or another implementation, optical sensor 202 can further include processor 126 disposed on second portion 120b of circuit board 120, where processor 126 can be disposed on a section of second portion 120b of circuit board 120 that is positioned inside tunnel 118 of shaft 116 of optical sensor button 200.

Figure 3A:
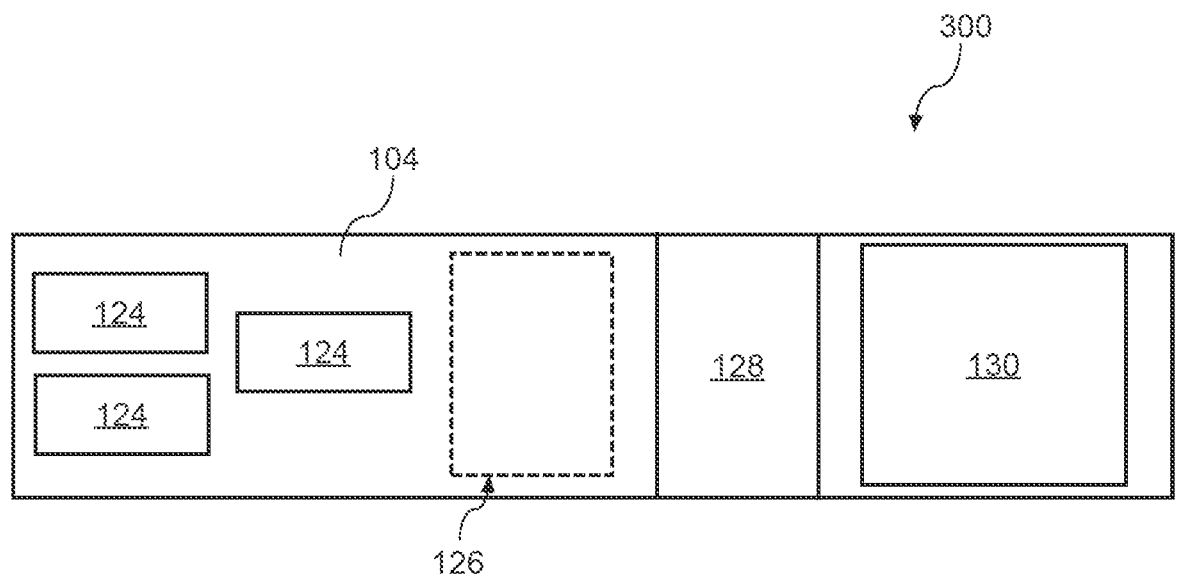
FIG. 3A illustrates a top view of an example, non-limiting optical sensor having a processor disposed on a surface of a substrate according to one or more implementations of the present disclosure.
Figure 3B:
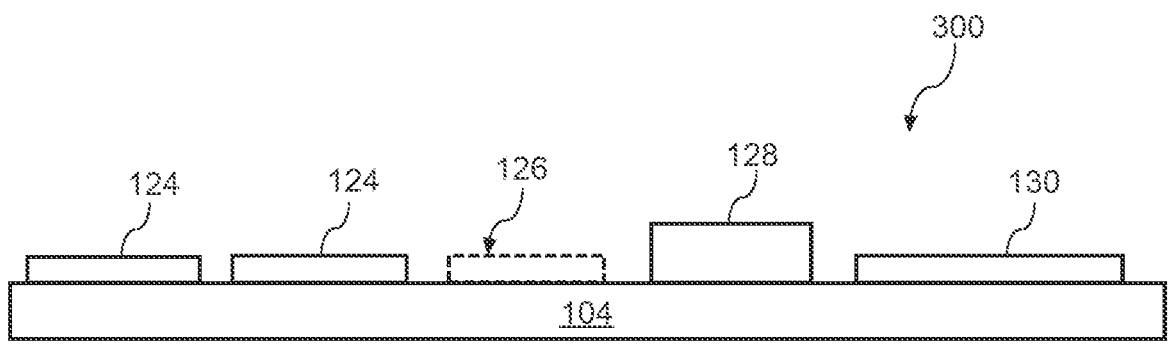
FIG. 3B illustrates a cross-sectional, side view of the optical sensor of FIG. 3A according to one or more implementations of the present disclosure.

FIG. 3A illustrates a top view of an example, non-limiting optical sensor 300 having processor 126 disposed on a surface of substrate 104 according to one or more implementations of the present disclosure. FIG. 3B illustrates a cross-sectional, side view of optical sensor 300 according to one or more implementations of the present disclosure.

Optical sensor 300 illustrated in FIGS. 3A and 3B can constitute an example, non-limiting implementation of optical sensor 102 described above and illustrated in the example implementation depicted in FIGS. 1A, 1B, and 1C. That is, for instance, in the example implementation depicted in FIGS. 3A and 3B, optical sensor 300 can include the same structure, components, attributes, and/or functionality as that of optical sensor 102 described above and illustrated in the example implementation depicted in FIGS. 1A, 1B, and 1C. Specifically, in the example implementation depicted in FIGS. 3A and 3B, optical sensor 300 can include substrate 104 having emitters 124, processor 126, optical baffle 128, and detector(s) 130 disposed on a surface (e.g., a top surface) of substrate 104. In this or another implementation, emitters 124 can be disposed on one end of substrate 104 and detector(s) 130 can be disposed on another end (e.g., opposite end) of substrate 104, where optical baffle 128 can be positioned between emitters 124 and detector(s) 130.

Figure 4A:
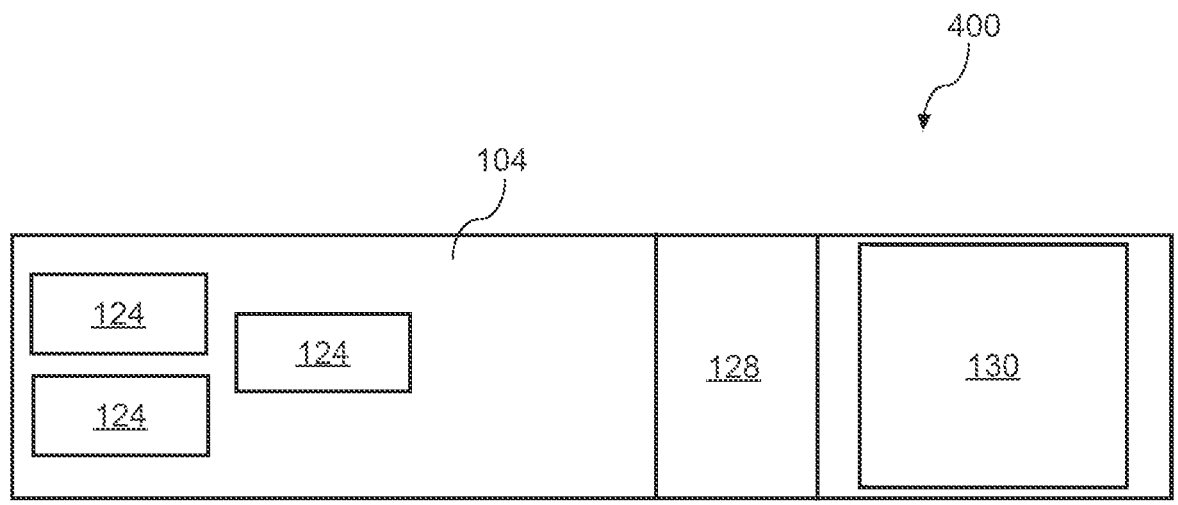
FIG. 4A illustrates a top view of an example, non-limiting optical sensor having a processor embedded in a substrate according to one or more implementations of the present disclosure.
Figure 4B:
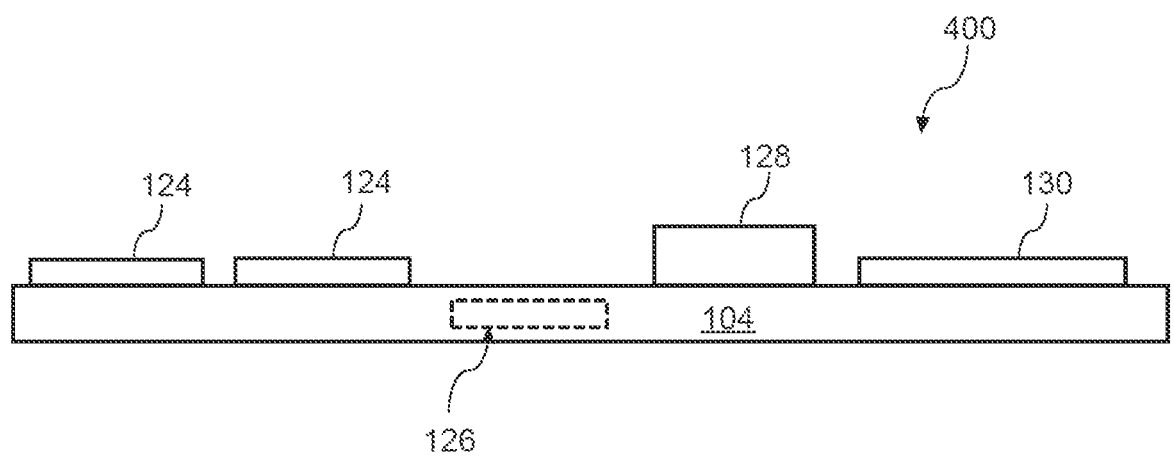
FIG. 4B illustrates a cross-sectional, side view of the optical sensor of FIG. 4A according to one or more implementations of the present disclosure.

FIG. 4A illustrates a top view of an example, non-limiting optical sensor 400 having processor 126 embedded in substrate 104 according to one or more implementations of the present disclosure. FIG. 4B illustrates a cross-sectional, side view of optical sensor 400 according to one or more implementations of the present disclosure.

Optical sensor 400 illustrated in FIGS. 4A and 4B can constitute an example, non-limiting implementation of optical sensor 102 and/or optical sensor 300 described above and illustrated in the example implementations depicted in FIGS. 1A, 1B, 1C, 3A, and 3B. That is, for instance, in the example implementation depicted in FIGS. 4A and 4B, optical sensor 400 can include the same structure, components, attributes, and/or functionality as that of optical sensor 102 and/or optical sensor 300 described above and illustrated in the example implementations depicted in FIGS. 1A, 1B, 1C, 3A, and 3B. Specifically, in the example implementation depicted in FIGS. 4A and 4B, optical sensor 400 can include substrate 104 having emitters 124, optical baffle 128, and detector(s) 130 disposed on a surface (e.g., a top surface) of substrate 104. In this or another implementation, emitters 124 can be disposed on one end of substrate 104 and detector(s) 130 can be disposed on another end (e.g., opposite end) of substrate 104, where optical baffle 128 can be positioned between emitters 124 and detector(s) 130. In this or another implementation, processor 126 can be disposed in substrate 104 such that processor 126 is embedded in (e.g., integrated in) substrate 104.

Figure 5:
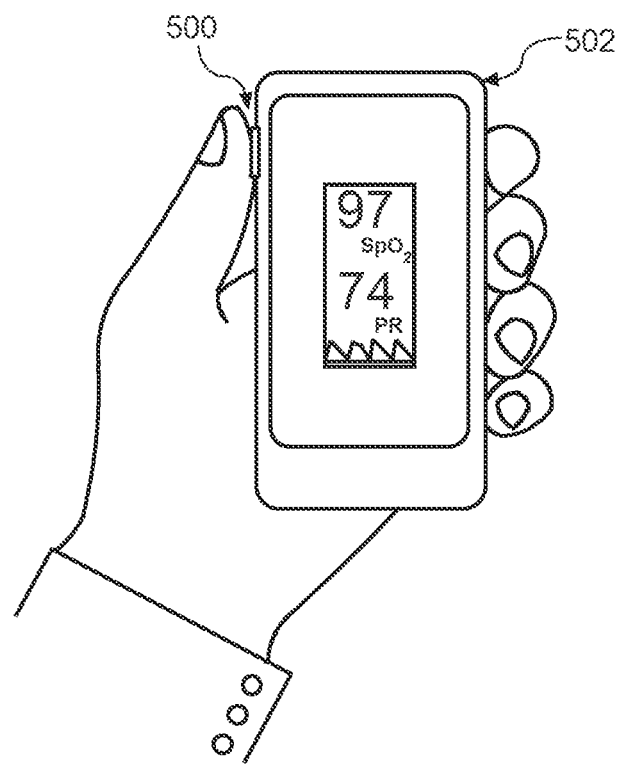
FIG. 5 illustrates a diagram of an example, non-limiting optical sensor button implemented in a smart phone device according to one or more implementations of the present disclosure.

FIG. 5 illustrates a diagram of an example, non-limiting optical sensor button 500 implemented in a smart phone device 502 according to one or more implementations of the present disclosure. Optical sensor button 500 depicted in the example implementation illustrated in FIG. 5 can constitute an example, non-limiting implementation of optical sensor button 100 and/or optical sensor button 200 described above and illustrated in the example implementations depicted in FIGS. 1A, 1B, 1C, 2A, 2B, and 2C. That is, for instance, in the example implementation depicted in FIG. 5, optical sensor button 500 can include the same structure, components, attributes, and/or functionality as that of optical sensor button 100 and/or optical sensor button 200 described above and illustrated in the example implementations depicted in FIGS. 1A, 1B, 1C, 2A, 2B, and 2C.

Figure 6:
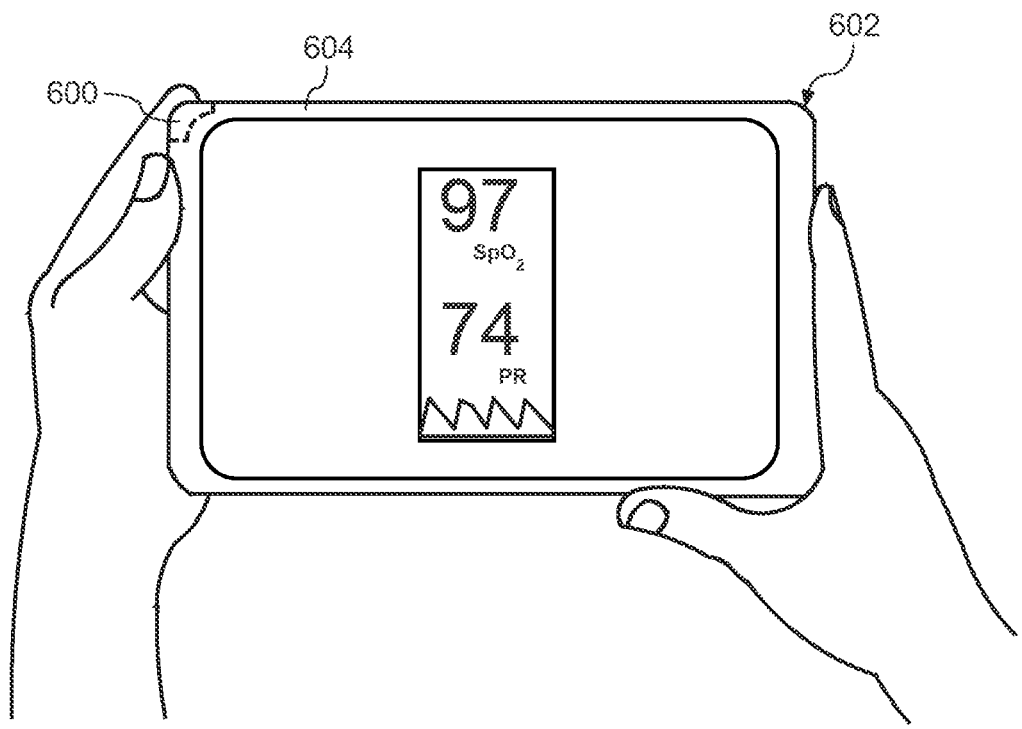
FIG. 6 illustrates a diagram of an example, non-limiting optical sensor button implemented in a tablet device according to one or more implementations of the present disclosure.

FIG. 6 illustrates a diagram of an example, non-limiting optical sensor button 600 implemented in a tablet device 602 according to one or more implementations of the present disclosure. In some implementations, optical sensor button 600 depicted in the example implementation illustrated in FIG. 6 can constitute an example, non-limiting implementation of optical sensor button 100 and/or optical sensor button 200 described above and illustrated in the example implementations depicted in FIGS. 1A, 1B, 1C, 2A, 2B, and 2C. That is, for instance, in the example implementation depicted in FIG. 6, optical sensor button 600 can include the same structure, components, attributes, and/or functionality as that of optical sensor button 100 and/or optical sensor button 200 described above and illustrated in the example implementations depicted in FIGS. 1A, 1B, 1C, 2A, 2B, and 2C.

In an additional or alternative implementation, optical sensor button 600 can be a virtual optical sensor button that can include the same attributes and/or functionality as that of optical sensor button 100 and/or optical sensor button 200 described above and illustrated in the example implementations depicted in FIGS. 1A, 1B, 1C, 2A, 2B, and 2C. However, in this implementation where optical sensor button 600 can be a virtual optical sensor button, optical sensor button 600 can be implemented in and/or disposed in tablet device 602 in a manner that can differ from how optical sensor button 100 and/or optical sensor button 200 can be implemented in and/or disposed in computing device 110.

For example, in implementations where optical sensor button 600 can be a virtual button, such a virtual optical sensor button can be disposed (e.g., embedded) in, for instance, a slotted section (not shown) of an external shell 604 of tablet device 602 (e.g., at an edge, corner, or bezel portion of external shell 604). In these implementations, an optical sensor such as, for instance, optical sensor 102 or optical sensor 202 can be disposed inside such a slotted section of external shell 604 of tablet device 602. In these implementations, a lens such as, for instance, lens 140 can extend across and be coupled to such a slotted section of external shell 604 of tablet device 602 to protect the optical sensor 202. In these implementations, the optical sensor (e.g., optical sensor 102, optical sensor 202) can include circuit board 120 having first portion 120a and second portion 120b. In these implementations, first portion 120a of circuit board 120 can be disposed in the slotted section of external shell 604 of tablet device 602 and second portion 120b of circuit board 120 can extend through an opening (not shown) in external shell 604 to an interior section of tablet device 602. In these implementations, an end of second portion 102b of circuit board 120 can be coupled to, for instance, a bus, a circuit board, a processor, and/or a memory of tablet device 602.

Figure 7:
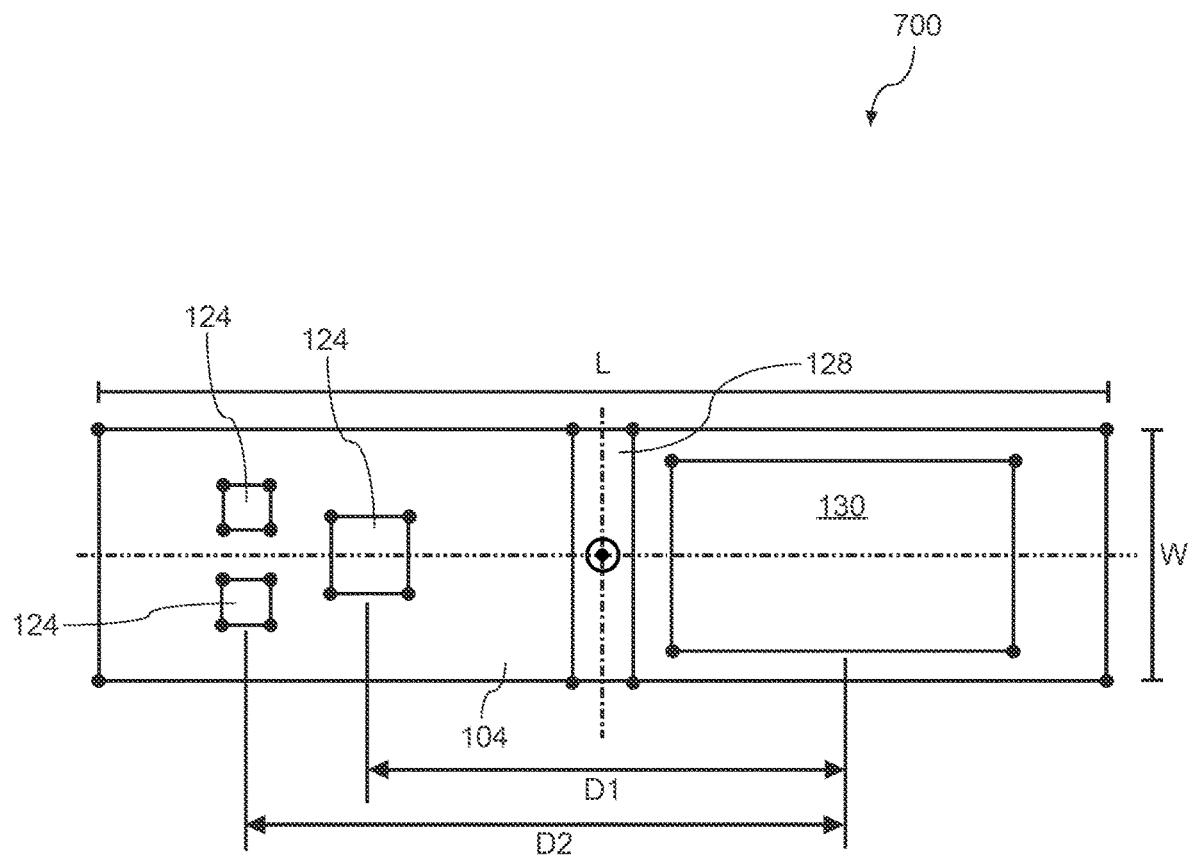
FIG. 7 illustrates a dimensioned drawing of an example, non-limiting optical sensor according to one or more implementations of the present disclosure.

FIG. 7 illustrates a dimensioned drawing of an example, non-limiting optical sensor 700 according to one or more implementations of the present disclosure. Optical sensor 700 depicted in the example implementation illustrated in FIG. 7 can constitute an example, non-limiting implementation of optical sensor 102, optical sensor 300, and/or optical sensor 400. For instance, optical sensor 700 can constitute an example, non-limiting implementation of optical sensor 400 having the example, non-limiting dimension ranges defined between certain components as illustrated in FIG. 7. For example, optical sensor 700 can constitute an example implementation of optical sensor 400 having the example dimension ranges defined between respective centerlines corresponding to emitters 124 and detector(s) 130 as illustrated in FIG. 7. Although not illustrated in the example implementation depicted in FIG. 7, in some implementations, optical sensor 700 can have a thickness ranging from about 0.5 millimeters (mm) to about 1.5 mm. It should be appreciated that other dimensions can be used with deviating from the intent and scope of the present disclosure.

In some implementations, the substrate 104 of the optical sensor 700 can have a length dimension L that is greater than a width dimension W due, at least in part, to the optical sensor 700 being integrated into a button (e.g., side button) on a computing device. For instance, in some implementations, the length dimension L can range from 7 millimeters to 9 millimeters. Furthermore, in such implementations, the width dimension W can range from 1 millimeter to 3 millimeters.

In some implementations, the emitters 124 can be positioned closer to a first end of the substrate 104 than a second end of the substrate 104 that is spaced apart from the first end along the length dimension L of the substrate 104. Furthermore, the detector(s) 130 can be positioned closer to the second end of the substrate 104 than the first end of the substrate. In this manner, a distance between the emitters 124 and the detector(s) 130 can be maximized to limit crosstalk which can degrade performance of the optical sensor 700. For instance, crosstalk can negatively affect the accuracy of biometrics (e.g., heart rate, SpO2) measured using the optical sensor 700.

In some implementations, a distance between a center of a first emitter (e.g., green LED) of the emitters 124 and a center of detector 130 can correspond to a first distance D1. Additionally, a distance between a center of a second emitter (e.g., red LED) of the emitters 124 and the center of detector 130 can correspond to a second distance D2 that is greater than the first distance. Furthermore, in some implementations, a distance between a center of the third emitter (e.g, infrared LED) of the emitters 124 and the center of detector 130 can correspond to the second distance D2 as well. In some implementations, the first distance D1 can range from 2 millimeters to 4 millimeters. Alternatively, or additionally, the second distance D2 can range from 4.5 millimeters to 7.5 millimeters.

Figure 8:
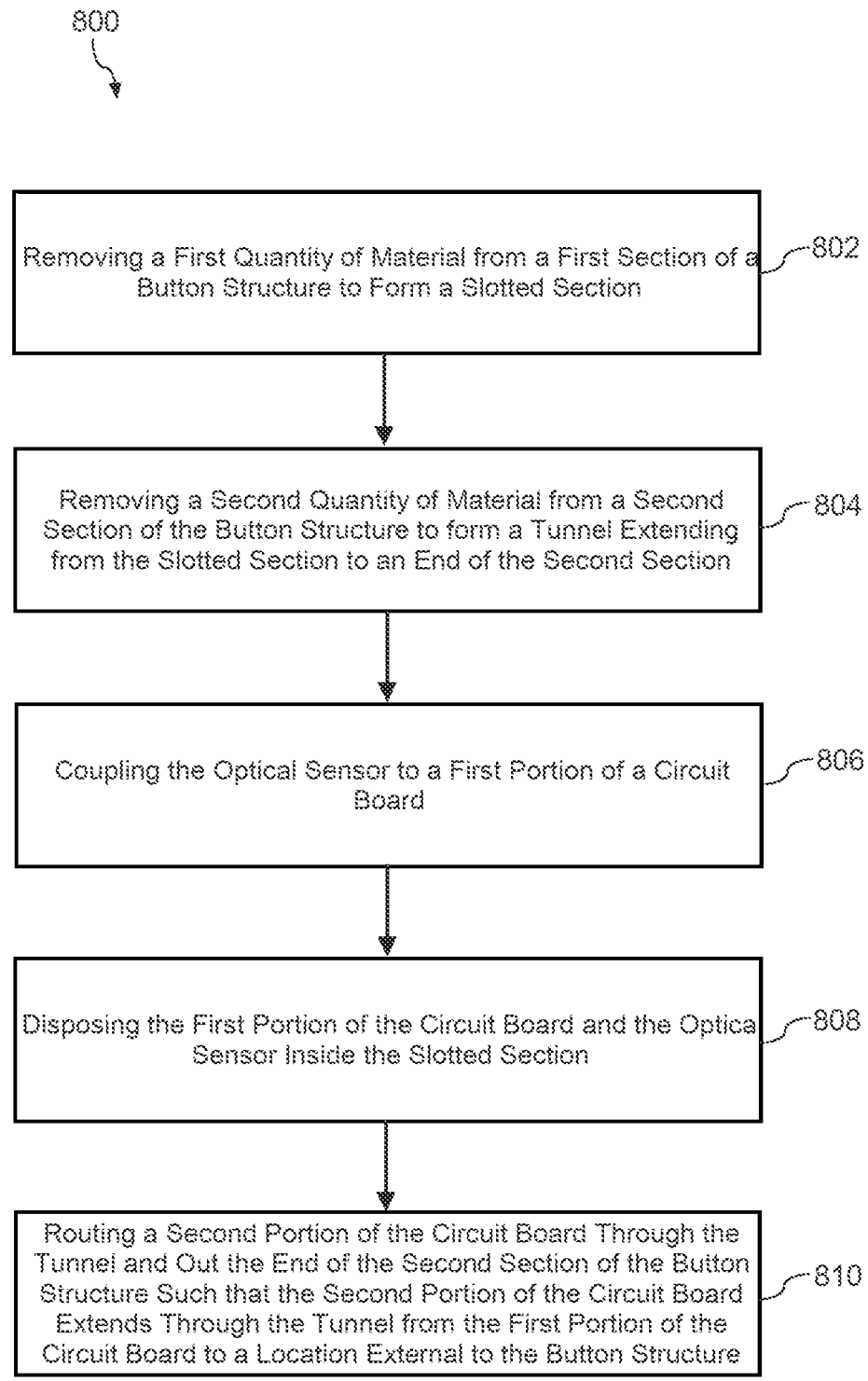
FIG. 8 illustrates a flow diagram of an example, non-limiting method that can be implemented to fabricate an optical sensor in a button structure to produce an optical sensor button for use in a computing device according to one or more implementations of the present disclosure.

FIG. 8 illustrates a flow diagram of an example, non-limiting method 800 that can be implemented to fabricate an optical sensor in a button structure to produce an optical sensor button for use in a computing device according to one or more implementations of the present disclosure. Method 800 can be implemented using, for instance, fabrication equipment that can facilitate formation of an optical sensor (e.g., optical sensor 102) in a button structure (e.g., main body 114) to produce an optical sensor button (e.g., optical sensor button 100) for use in an electronic and/or computing device (e.g., computing device 110). For example, method 800 can be implemented using, for instance, fabrication equipment used to fabricate integrated circuits and/or semiconductor devices. In some implementations, method 800 can be implemented using, for instance, a computing system that can be coupled (e.g., communicatively, electrically, operatively) to such fabrication equipment. In these implementations, such a computing system can include one or more processors and one or more non-transitory computer-readable storage media that can include instructions that, when executed by the one or more processors, can cause the computing system and/or the fabrication equipment to perform one or more operations of method 800.

The example implementation illustrated in FIG. 8 depicts operations performed in a particular order for purposes of illustration and discussion. Those of ordinary skill in the art, using the disclosures provided herein, will understand that various operations or steps of method 800 or any of the other methods disclosed herein can be adapted, modified, rearranged, performed simultaneously, removed, include operations not illustrated, and/or modified in various ways without deviating from the intent and/or scope of the present disclosure.

At 802, method 800 can include removing a first quantity of material from a first section (e.g., a first section of main body 114) of a button structure (e.g., main body 114) to form a slotted section (e.g., slotted section 112).

At 804, method 800 can include removing a second quantity of material from a second section (e.g., shaft 116) of the button structure to form a tunnel (e.g., tunnel 118) extending from the slotted section to an end of the second section.

At 806, method 800 can include coupling an optical sensor (e.g., optical sensor 102) to a first portion (e.g., first portion 120a) of a circuit board (e.g., circuit board 120).

At 808, method 800 can include disposing the first portion of the circuit board and the optical sensor inside the slotted section.

At 810, method 800 can include routing a second portion (e.g., second portion 120b) of the circuit board through the tunnel and out the end of the second section of the button structure such that the second portion of the circuit board extends through the tunnel from the first portion of the circuit board to a location external to the button structure.

Figure 9:
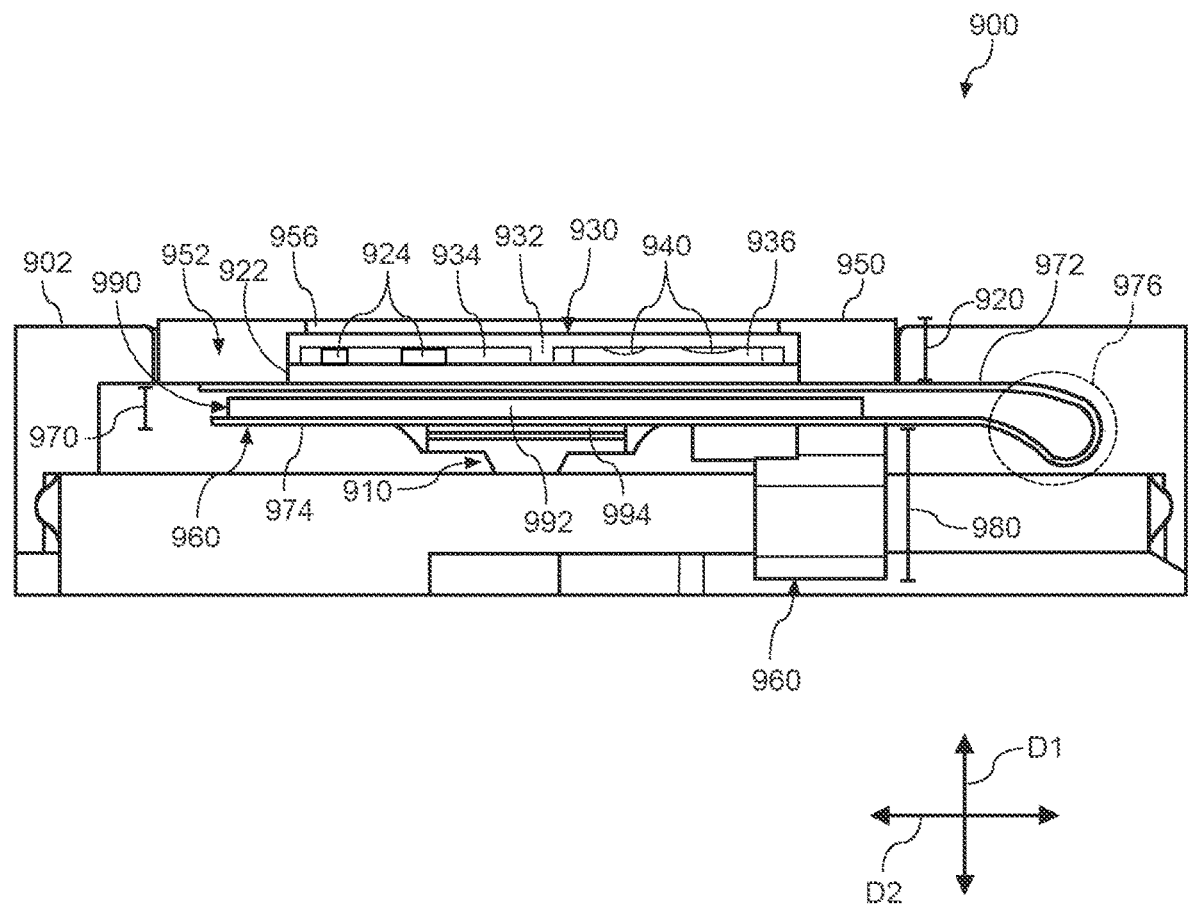
FIG. 9 illustrates a cross-sectional view of a button assembly for a computing device according to some implementations of the present disclosure.
Figure 10:
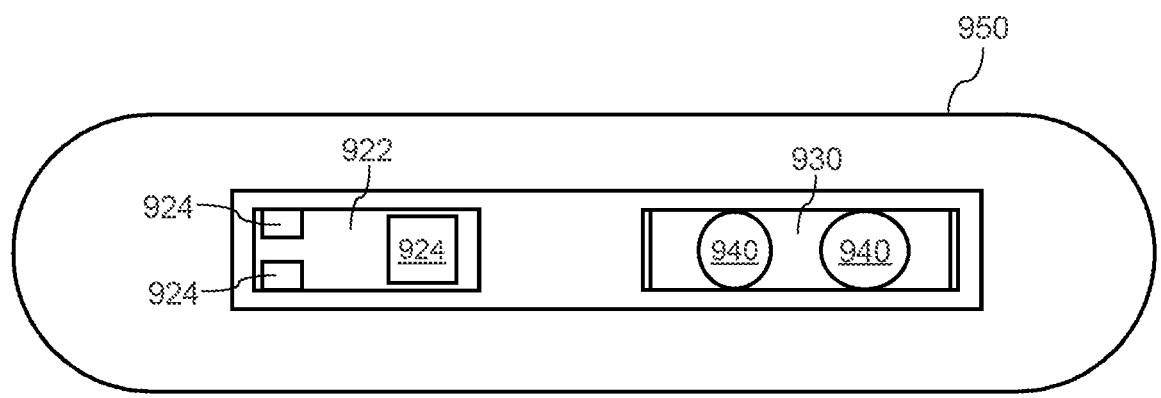
FIG. 10 illustrates a plan view of a button assembly for a computing device according to some implementations of the present disclosure.
Figure 11:
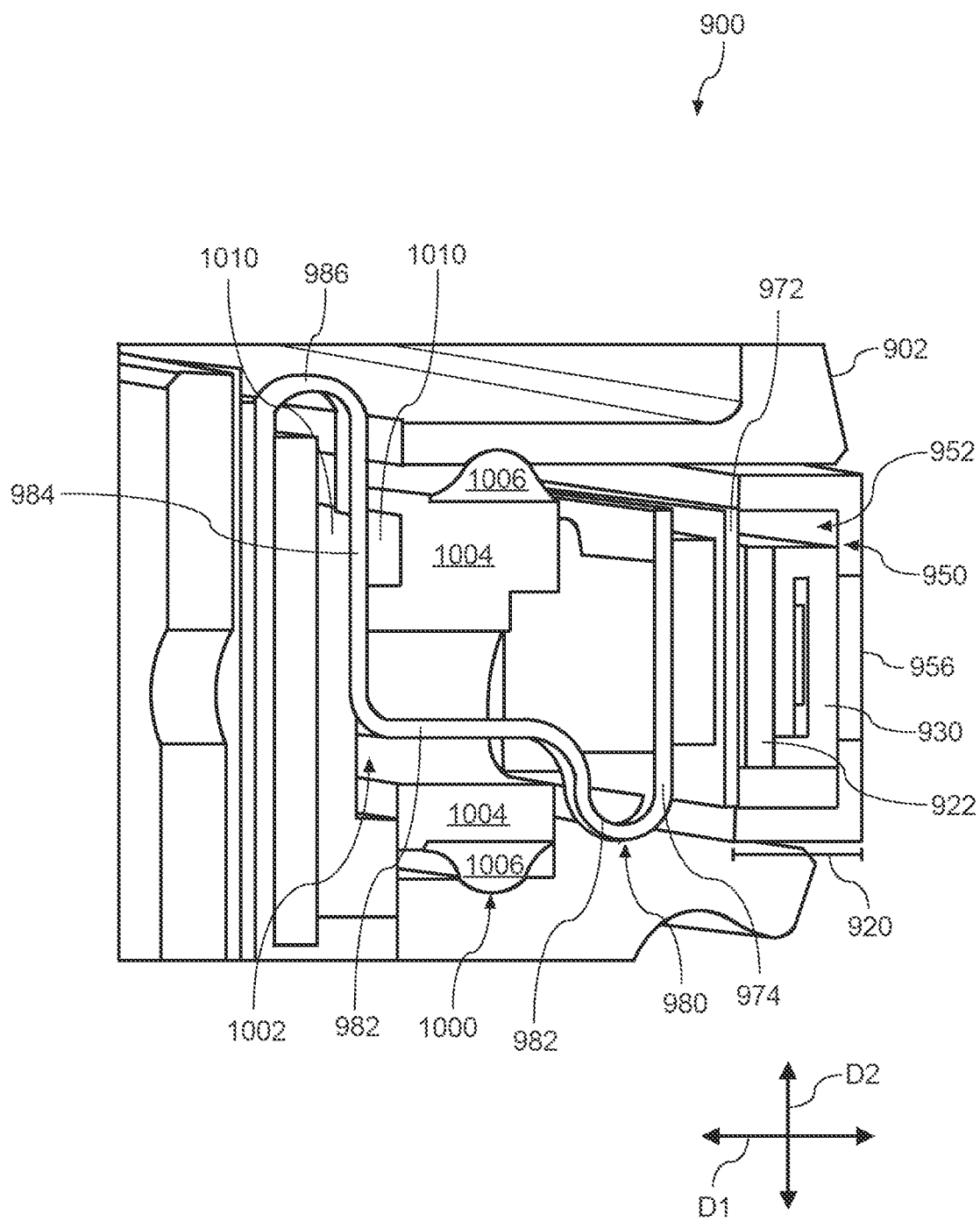
FIG. 11 depicts another cross-sectional view of a button assembly for a computing device according to some implementations of the present disclosure.

Referring now to FIGS. 9-11, a button assembly 900 for a computing device is provided according to some implementations of the present disclosure. The button assembly 900 can include a button 910 (e.g., tactile switch) and an optical sensor 920. As shown, the button 910 and the optical sensor 920 can both be positioned within an interior of an external shell or housing 902 of the computing device. More particularly, the button 910 can be positioned on a base 1000 of the button assembly 900 that is positioned within the interior of the external shell 902 of the computing device. Details of the optical sensor 920 will now be discussed in more detail.

The optical sensor 920 can include a substrate 922 and a plurality of emitters 924 disposed thereon. Each of the plurality of emitters 924 can be configured to emit light. In some implementations, the plurality of emitters 924 can include a first emitter configured to emit light at a first wavelength (e.g., red wavelength), a second emitter configured to emit light at a second wavelength (e.g., infrared wavelength), and a third emitter configured to emit light at a third wavelength (e.g., green wavelength). In alternative implementations, the optical sensor 920 can include more or fewer emitters.

The optical sensor 920 can include a cover 930 that includes a barrier wall 932 dividing the interior of the cover 930 into a first portion 934 and a second portion 936. In some implementations, the barrier wall 932 can include an optical baffle. As shown, the cover 930 can be positioned on the substrate 922 such that that plurality of emitters 924 are disposed within the first portion 934 of the interior of the cover 930.

The optical sensor 920 can include a plurality of detectors 940 (e.g., detectors). In some implementations, the plurality of detectors 940 can be disposed on an interior surface of the cover 930. More particularly, the detectors 940 can be disposed on an interior surface defining the second portion of the interior of the cover 930. In alternative implementations, the detectors 940 can be disposed on the substrate 922.

It should be understood that light emitted from each of the plurality of emitters 924 can exit the cover 930 and reflect off of a body part (e.g., finger) of a user interacting with the button assembly 900. It should also be understood that the reflected light can renter the interior of the cover 930, specifically the second portion 936 thereof, and can be detected by the plurality of detectors 940. In this manner, the optical sensor 920 can be a PPG sensor.

In some implementations, the button assembly 900 can include a body or housing 950 that is movable relative to the housing 902 of the computing device and configured to accommodate the optical sensor 920. For instance, both the substrate 922 and the cover 930 of the optical sensor 920 can be positioned within an interior 952 of the housing 950. In some implementations, the housing 950 can define an opening 954 in which an optic 956 (e.g., lens) is positioned. It should be understood that light emitted from the emitters 924 can pass through the optic 956.

The button assembly 900 can include a flexible printed circuit 960 that includes a base portion 970 and a tail portion 980. The base portion 970 can include a first segment 972 and a second segment 974 that is spaced apart from the first segment 972 along a first direction D1. The base portion 970 can further include a third segment 976 extending from the first segment 972 to the second segment 974. The third segment 976 can be spaced apart from the optical sensor 920 along a second direction D2 that is substantially perpendicular (e.g., within about 10 degrees of perpendicular) to the first direction D1. In some implementations, the third segment 976 can have an arcuate shape. It should be understood, however, that the third segment 976 can have any suitable shape.

The button assembly 900 can include a stiffener 990 that is at least partially positioned within a space or gap defined between the first segment 972 of the base portion 970 and the second segment 974 of the base portion 970. For instance, the stiffener 990 can include a first portion 992 positioned within the gap. The stiffener 990 can further include a second portion 994 that is positioned outside of the gap. More specifically, the second portion 994 of the stiffener 990 can be positioned between the button 910 and the second segment 974 of the base portion 970 of the flexible printed circuit 960.

In some implementations, the stiffener 990 can be formed from metal. For instance, in some implementations, the stiffener 990 can be formed from stainless steel. It should be understood that, in alternative implementations, the stiffener 990 can be formed from other suitable types of metal.

As shown, the tail portion 980 of the flexible printed circuit 960 can include a first segment 982, a second segment 984, and a third segment 986. The first segment 982 of the tail portion 980 can extend from the second segment 974 of the base portion 970. As shown, the first segment 982 of the tail portion 980 can extend through a tunnel 1002 defined by the base 1000 of the button assembly 900. The second segment 984 of the tail portion 980 can extend from the first segment 982 of the tail portion 980 and can be positioned within a seal member 1010 of the button assembly 900 as shown. For instance, the second segment 984 of the tail portion 980 can be sandwiched between opposing surfaces of the seal member 1010. The third segment 986 of the tail portion 980 can extend from the second segment 984 and can be coupled to a printed circuit board (not shown) included within the interior of the computing device. For instance, in some implementations, the third segment 986 of the tail portion 980 can be directly connected to the printed circuit board of the computing device. Alternatively, the third segment 986 of the tail portion 980 can be connected to the printed circuit via one or more intermediate components (e.g., board to board connectors).

It should be understood that the seal member 1010 prevents the ingress of water into the interior of the computing device. For instance, a seal can be formed between the second segment 984 of the tail portion 980 of the flexible printed circuit 960 and the interior surfaces of the seal member 1010. In this manner, water cannot pass into the interior of the computing device where the third segment 986 of the tail portion 980 couples to the printed circuit board of the computing device.

In some implementations, the base 1000 can include a first material (e.g., plastic) and a second material (e.g., rubber). The second material can facilitate a seal between the base 1000 and an interior surface of the external shell 902 of the computing device. For instance, in some implementations, the seal can be a water-tight seal to prevent water from entering the interior of the computing device. It should be understood that the interior of the computing device can refer to a portion of the interior of the external shell that is different from the portion of the external shell in which the button assembly 900 is positioned.

As shown, the optical sensor 920 can be electrically coupled to the flexible printed circuit 960. For instance, the optical sensor 920 can be electrically coupled to the base portion 970 of the flexible printed circuit 960. More specifically, the optical sensor 920 can be electrically coupled to the first segment 972 of the base portion 970. Operation of the button assembly 900 will now be discussed.

When the user applies a force F to the housing 950 along the first direction D1 to move the housing 950 of the button assembly 900 from a first position to a second position, the force F can be transferred to the button 910 (e.g., tactile switch) via the flexible printed circuit 960 and the stiffener 990. More particularly, the base portion 970 of the flexible printed circuit 960 can move along the first direction D1 such that the stiffener 990 contacts (e.g., presses) the button 910. For instance, the second portion 994 of the stiffener 990 can contact the button 910. In this manner, the user can actuate the button 910 by applying a force F to the housing 950.

Additional Disclosure

The technology discussed herein makes reference to various computer-based devices and/or systems, as well as actions performed by such devices and/or systems. The inherent flexibility of computer-based devices and/or systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example implementations thereof, each example is provided by way of explanation, not limitation of the disclosure. Those skilled in the art, upon attaining an understanding of the foregoing, can readily produce alterations to, variations of, and equivalents to such implementations. Accordingly, the subject disclosure does not preclude inclusion of such modifications, variations and/or additions to the present subject matter as would be readily apparent to one of ordinary skill in the art. For instance, features illustrated or described as part of one implementation can be used with another implementation to yield a still further implementation. Thus, it is intended that the present disclosure covers such alterations, variations, and equivalents.

What is claimed is:

1. A computing device comprising:
a housing defining an aperture extending therethrough; and
a button comprising:
a switch;
a body at least partially disposed within the aperture, the body movable relative to the housing between a first position and a second position to selectively actuate the switch to cause the computing device to perform a function;
a printed circuit electrically coupled to one or more processors of the computing device; and
an optical sensor disposed within an interior of the body and configured to obtain biometric data for determining one or more biometrics of a user, the optical sensor comprising:
a substrate coupled to the printed circuit, the substrate having a length dimension and a width dimension that is less than the length dimension;
one or more emitters positioned closer to a first end of the substrate than a second end of the substrate that is spaced apart from the first end along the length dimension; and
one or more detectors positioned closer to the second end than the first end.

2. The computing device of claim 1, wherein the optical sensor further comprises:
an optical baffle disposed on the substrate to divide the substrate into a first portion on which the one or more emitters are disposed and a second portion on which the one or more detectors are disposed.

3. The computing device of claim 1, wherein the one or more emitters comprise a first light emitting diode (LED) configured to emit red light and a second LED configured to emit green light.

4. The computing device of claim 3, wherein the one or more emitters further comprise a third LED configured to emit infrared light.

5. The computing device of claim 4, wherein the first LED and the second LED are both positioned closer to the first end than the third LED.

6. The computing device of claim 1, wherein the length dimension of substrate is in a range of 7 millimeters to 9 millimeters.

7. The computing device of claim 6, wherein the width dimension of the substrate is in a range of 1 millimeter to 3 millimeters.

8. The computing device of claim 1, wherein the button further comprises:
a sealing member positioned within the aperture between an exterior surface of the body and an interior surface of the housing.

9. The computing device of claim 1, wherein the function comprises powering on and powering off the computing device.

10. The computing device of claim 1, wherein the printed circuit comprises a flexible printed circuit configured to support the body.

11. The computing device of claim 10, wherein the button further comprises:
a stiffener partially positioned within a gap defined between a first portion of the flexible printed circuit and a second portion of the flexible printed circuit.

12. The computing device of claim 11, wherein:
when the body is in the first position, the stiffener does not contact the switch; and
when the body is in the second position, the stiffener contacts the switch.

13. The computing device of claim 11, wherein the stiffener is formed from a metal material.

14. The computing device of claim 1, wherein the button further comprises:
a lens coupled to the body such that light emitted from the one or more emitters of the optical sensor exit the interior of the body via the lens.

15. The computing device of claim 1, wherein the one or more biometrics comprise at least one of a heart rate of the user or a blood oxygen level of the user.

16. The computing device of claim 1, wherein the optical sensor further comprises:
an application specific integrated circuit (ASIC) embedded in the substrate, the ASIC configured to control operation of the one or more emitters and the one or more detectors.

17. The computing device of claim 1, wherein the switch comprises a tactile switch.

18. A button for a computing device, the button comprising:
a switch;
a body movable between a first position and a second position to selectively actuate the switch;
a printed circuit electrically couplable to one or more processors of the computing device; and
an optical sensor disposed within an interior of the body, the optical sensor comprising:
a substrate coupled to the printed circuit, the substrate having a length dimension and a width dimension that is less than the length dimension;
one or more emitters disposed on the substrate, the one or more emitters positioned closer to a first end of the substrate than a second end of the substrate that is spaced apart from the first end along the length dimension; and
one or more detectors positioned closer to the second end than the first end.

19. The button of claim 18, wherein the optical sensor further comprises:
an optical baffle disposed on the substrate to divide the substrate into a first portion on which the one or more emitters are disposed and a second portion on which the one or more detectors are disposed.

20. The button of claim 18, further comprising:
a lens coupled to the body such that light emitted from the one or more emitters of the optical sensor exit the interior of the body via the lens.

* * * * *